US010266072B2

(12) United States Patent
Nakamura et al.

(10) Patent No.: US 10,266,072 B2
(45) Date of Patent: Apr. 23, 2019

(54) POWER SEAT OPERATION DEVICE AND POWER SEAT

(71) Applicant: NHK SPRING CO., LTD., Yokohama (JP)

(72) Inventors: Takeshi Nakamura, Yokohama (JP); Kenichi Katsube, Yokohama (JP); Souichi Nakayama, Yokohama (JP); Takenori Takashima, Kawasaki (JP); Satoshi Myojin, Kawasaki (JP); Tomonori Tanabe, Kawasaki (JP)

(73) Assignee: NHK Spring Co., Ltd., Yokohama-shi, Kanagawa (JP)

( * ) Notice: Subject to any disclaimer, the term of this patent is extended or adjusted under 35 U.S.C. 154(b) by 58 days.

(21) Appl. No.: 15/566,017

(22) PCT Filed: Mar. 30, 2016

(86) PCT No.: PCT/JP2016/060558
§ 371 (c)(1),
(2) Date: Oct. 12, 2017

(87) PCT Pub. No.: WO2016/167130
PCT Pub. Date: Oct. 20, 2016

(65) Prior Publication Data
US 2018/0111508 A1 Apr. 26, 2018

(30) Foreign Application Priority Data

Apr. 16, 2015 (JP) .................................. 2015-084189

(51) Int. Cl.
B60N 2/02 (2006.01)
H01H 19/00 (2006.01)
(Continued)

(52) U.S. Cl.
CPC ......... *B60N 2/0228* (2013.01); *B60N 2/0296* (2013.01); *H01H 19/00* (2013.01);
(Continued)

(58) Field of Classification Search
None
See application file for complete search history.

(56) References Cited

U.S. PATENT DOCUMENTS 5,163,734 A * 11/1992 Hakansson .......... B60N 2/0296
248/396
2009/0294259 A1* 12/2009 Kuno .................. B60N 2/0228
200/4
2010/0321215 A1* 12/2010 Kato .................... H01H 25/008
341/35

FOREIGN PATENT DOCUMENTS

CN 202339868 U 7/2012
DE 102005001560 A1 * 7/2006 ............. G05G 1/015
(Continued)

OTHER PUBLICATIONS

Chinese Office Action dated Aug. 28, 2018 in corresponding Japanese Patent Application No. 201680021348.7 in 9 pages (partial English translation).

*Primary Examiner* — David E Allred
(74) *Attorney, Agent, or Firm* — Knobbe, Martens, Olson & Bear, LLP

(57) ABSTRACT

In a power seat operation device, a slider that is supported so as to be slidable in a radial direction with respect to a dial slides toward the radial direction center of the dial during rotation of the dial. A knob engagement portion that is provided to the slider is thereby disposed between a pair of slider engagement portions that are provided to a knob. This enables rotational operation of the knob to be restricted. However, during rotational operation of the knob, one out of the pair of slider engagement portions opposes the knob (Continued)

engagement portion from toward the radial direction center of the dial. This enables rotational operation of the dial in conjunction with sliding of the slider to be restricted.

6 Claims, 17 Drawing Sheets

(51) Int. Cl.
  *H01H 19/14* (2006.01)
  *H01H 25/00* (2006.01)
  *B60N 2/90* (2018.01)

(52) U.S. Cl.
  CPC .......... *H01H 19/14* (2013.01); *H01H 25/008* (2013.01); *B60N 2/90* (2018.02)

(56) References Cited

FOREIGN PATENT DOCUMENTS

| | | | | |
|---|---|---|---|---|
| JP | 2012-146429 A | 8/2012 | | |
| JP | 2014-201267 A | 10/2014 | | |
| WO | WO-2012077759 A1 * | 6/2012 | ............. | F16H 55/06 |
| WO | 2014/034501 A1 | 3/2014 | | |

* cited by examiner

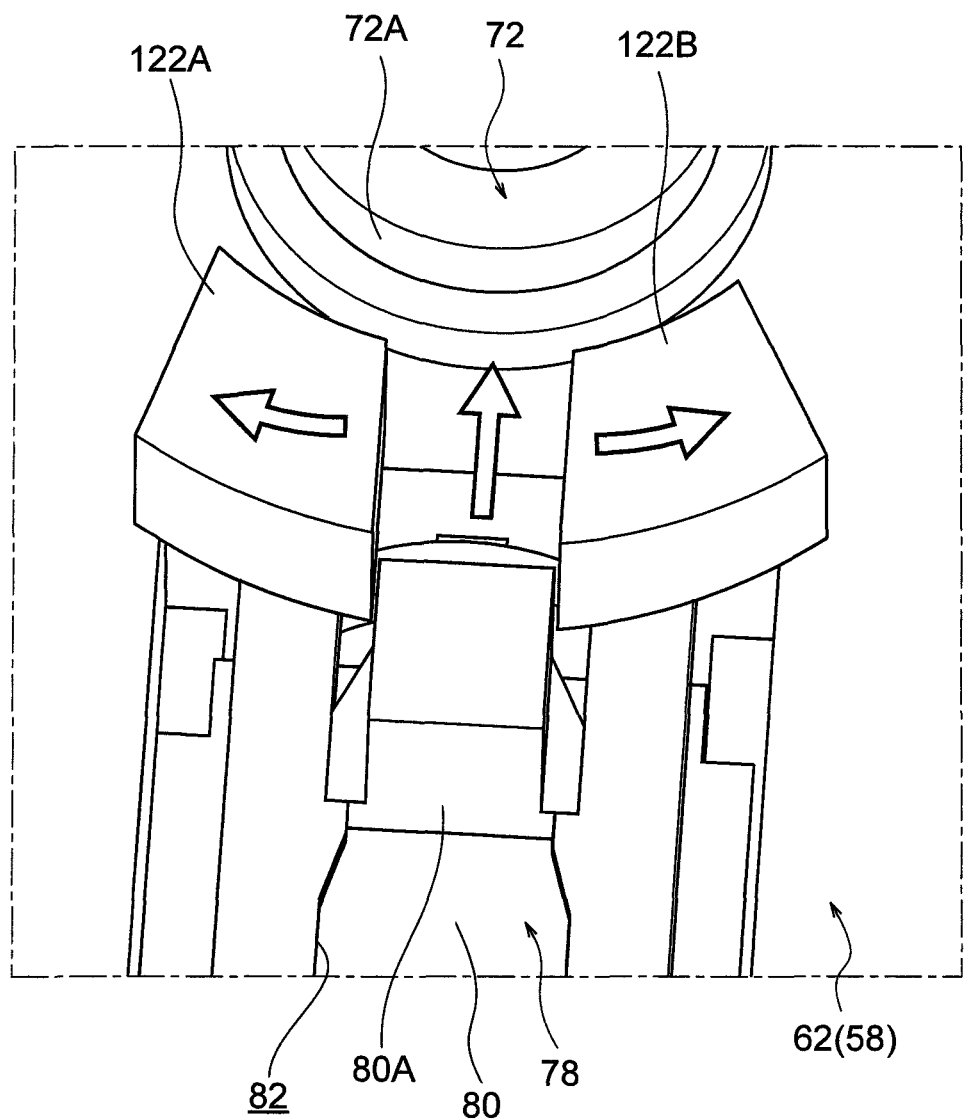

POWER SEAT OPERATION DEVICE AND POWER SEAT

CROSS-REFERENCE TO RELATED APPLICATIONS

This application is the U.S. National Phase under 35 U.S.C. § 371 of International Application PCT/JP2016/060558, filed Mar. 30, 2016, which claims priority to Japanese Patent Application No. 2015-084189, filed Apr. 16, 2015. The disclosures of the above-described applications are hereby incorporated by reference in their entirety.

TECHNICAL FIELD

The present invention relates to a power seat and an operation device for operating plural movement mechanisms provided to a power seat.

BACKGROUND ART

Japanese Patent Application Laid-Open (JP-A) No. 2014-201267 describes a power seat operation device including a dial portion that is provided so as to be capable of rotational operation with respect to a power seat. An operation-target movement mechanism is selected from out of plural movement mechanisms provided to the power seat by the rotational operation of the dial portion. Further, a switch knob (knob) is provided to the dial portion. The knob is operated to actuate the selected movement mechanism. Note that similar technology is described in JP-A No. 2012-146429.

SUMMARY OF INVENTION

Technical Problem

In the power seat operation device configured as described above, when rotational operation of the dial portion and operation of the knob are performed simultaneously, there is a chance that an unintended movement mechanism will be accidentally actuated. There is thus room for improvement with regards to preventing such malfunction.

In consideration of the above circumstances, an object of the present invention is to obtain a power seat operation device and a power seat in which malfunction due to simultaneous operation of a dial and a knob can be prevented.

Solution to Problem

A power seat operation device of a first aspect of the present invention includes a dial, a knob, and a slider. The dial is rotatable with respect to a power seat provided with plural of movement mechanisms, and one out of the plural movement mechanisms is selected by the rotational operation of the dial. The knob is rotatable with respect to the dial, the selected movement mechanism is actuated by the rotational operation of the knob, and the knob includes a pair of slider engagement portions that face each other in a rotation direction of the knob. The slider is supported so as to be slidable in a radial direction with respect to the dial. The slider includes a knob engagement portion, and the slider slides toward one side in the radial direction in conjunction with rotational operation of the dial such that the knob engagement portion is disposed between the pair of slider engagement portions, with one of the pair of slider engagement portions opposing the knob engagement portion from the one side in the radial direction during rotation of the knob.

In the power seat operation device of the first aspect, one out of the plural movement mechanisms provided to the power seat is selected when the dial is rotationally operated with respect to the power seat. The selected movement mechanism is actuated when the knob provided to the dial is rotationally operated with respect to the dial.

During rotational operation of the dial, in conjunction with rotational operation of the dial, the slider supported so as to be capable of sliding in the radial direction with respect to the dial slides toward one side in the radial direction of the dial. The knob engagement portion provided to the slider is thereby disposed between the pair of slider engagement portions provided to the knob. Since the pair of slider engagement portions face each other in the rotation direction of the knob, in a state in which the knob engagement portion is disposed between the pair of slider engagement portions, rotational operation of the knob is able to be restricted by the pair of slider engagement portions and the knob engagement portion abutting against each other.

However, during rotational operation of the knob, one out of the pair of slider engagement portions opposes the knob engagement portion from the one side in the radial direction of the dial. In this state, sliding of the slider toward the one side in the radial direction of the dial is restricted by the knob engagement portion of the slider abutting the one out of the pair of slider engagement portions. This enables rotational operation of the dial accompanying (in conjunction with) sliding of the slider to be restricted. The present invention thereby enables malfunction due to simultaneous operation of the dial and the knob to be prevented.

A power seat operation device of a second aspect of the present invention is the first aspect, wherein the knob is provided so as to be coaxial with the dial.

In the power seat operation device of the second aspect, the knob, which is rotationally operated with respect to the dial, is provided so as to be coaxial with the dial. This enables the shape of the knob engagement portion provided to the slider that is slid with respect to the dial and the shape of the pair of slider engagement portions provided to the knob to be set according to the rotational center of the dial. This enables design to be simplified.

A power seat operation device of a third aspect of the present invention is the first aspect or the second aspect, further including a dial base that is attached to the power seat, that is formed with a cam portion, and that supports the dial such that the dial is rotatable. Further, in the power seat operation device of the third aspect, the slider slides with respect to the dial by engagement with the cam portion.

In the power seat operation device of the third aspect, the dial base attaches to the power seat, and the dial base supports the dial such that the dial is capable of rotational operation. The cam portion engaged with the slider is provided to the dial base. When the dial is rotationally operated with respect to the dial base, the slider supported so as to be capable of sliding in the radial direction with respect to the dial is slid toward the one side in the radial direction of the dial by engagement with the cam portion. This enables rotational operation of the dial and sliding of the slider to be coordinated using a simple configuration.

A power seat operation device of a fourth aspect of the present invention is the third aspect, wherein the cam portion forms an undulation in the radial direction and the slider is abutted against the cam portion by biasing force from an elastic member.

In the fourth aspect, the slider supported so as to be capable of sliding in the radial direction with respect to the dial is abutted against the cam portion of the dial base by biasing force from the elastic member. The cam portion forms an undulation in the radial direction of the dial, and during rotational operation of the dial, the slider moves along the undulation of the cam portion. The undulation in the cam portion enables a clicking sensation to be imparted to rotational operation of the dial.

A power seat operation device of a fifth aspect of the present invention is the fourth aspect, wherein the cam portion includes an undulating face that faces toward a center in the radial direction and the slider is biased toward an outer side in the radial direction.

In the power seat operation device of the fifth aspect, the undulating face of the cam portion formed to the dial base faces the radial direction center of the dial, and the slider supported by the dial is biased toward the radial direction outer side of the dial so as to abut the cam portion. This enables the undulation in the cam portion to be set larger than in a configuration in which an undulating face of a cam portion faces the radial direction outer side of a dial and a slider is biased toward the radial direction center of the dial. Design and production is thus simplified.

A power seat of a sixth aspect of the present invention includes a seat body and the power seat operation device of any one of the first aspect to the fifth aspect. The seat body is provided with the plural movement mechanisms, and the dial of the power seat operation device being provided so as to be rotatable with respect to the seat body.

In the power seat of the sixth aspect, the dial of the power seat operation device is provided so as to be capable of rotational operation with respect to the seat body provided with the plural movement mechanisms. This power seat operation device is as described in any one of the first aspect to the fifth aspect, and so is able to obtain the advantageous effects described above.

Advantageous Effects of Invention

As described above, in a power seat operation device and a power seat according to the present invention, malfunction due to simultaneous operation of a dial and a knob can be prevented.

BRIEF DESCRIPTION OF DRAWINGS

FIG. 17 is a perspective view illustrating configuration around a pair of slider engagement portions and a knob engagement portion.

DESCRIPTION OF EMBODIMENTS

Explanation follows regarding a power seat operation device 10 and a power seat 12 according to an exemplary embodiment of the present invention, with reference to FIG. 1 to FIG. 19. Note that in each of the drawings, the arrow FR indicates the vehicle front direction, the arrow UP indicates the vehicle upper direction, and the arrow OUT indicates outward in the vehicle width direction, as appropriate. In the present exemplary embodiment, the front, rear, up, and down directions, and the width direction (left-right direction), of the power seat 12 respectively correspond to the front, rear, up, and down directions, and the width direction (left-right direction), of the vehicle.

Overall Schematic Configuration of Power Seat 12

Figure 1:
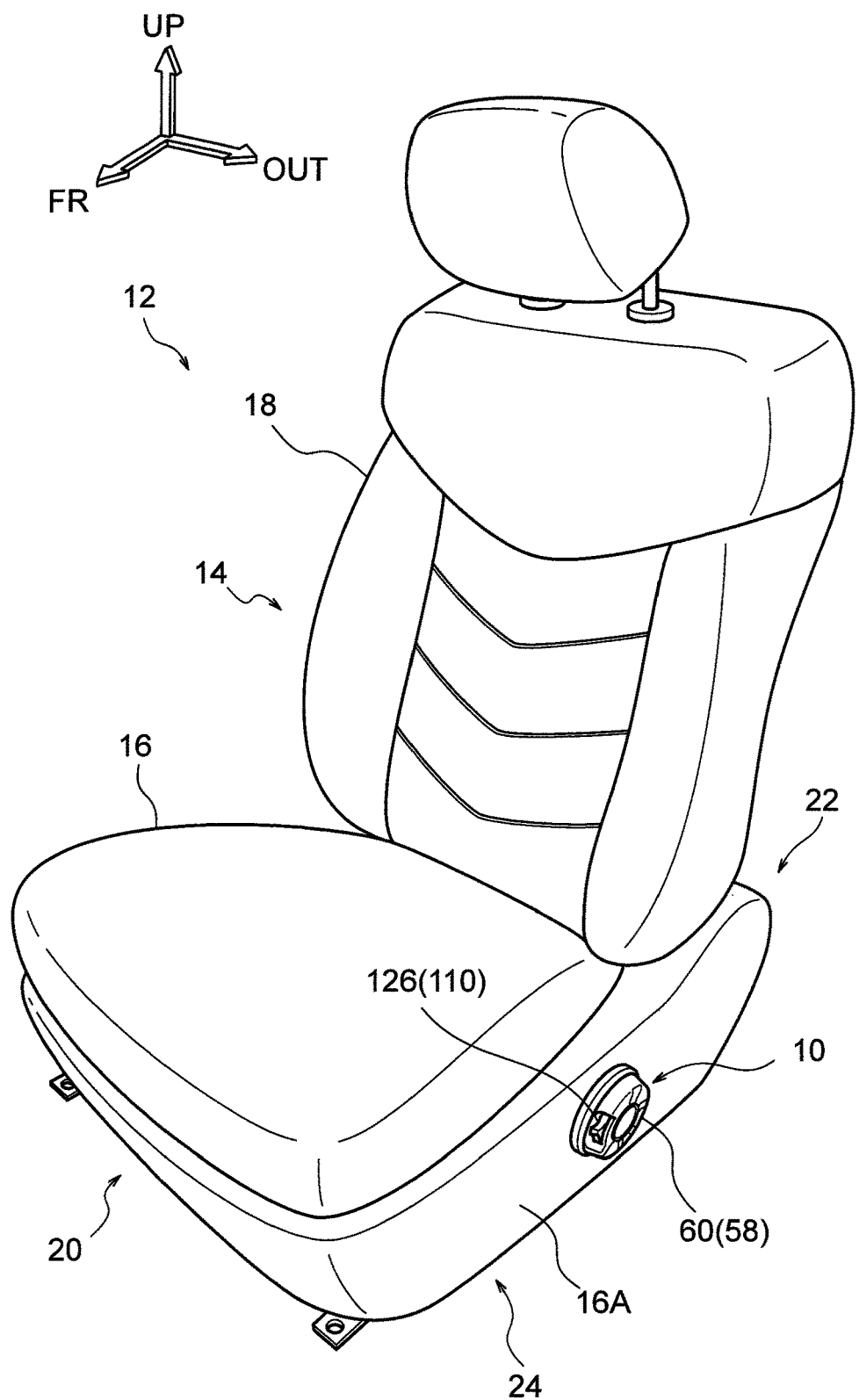
FIG. 1 is a perspective view of a power seat according to an exemplary embodiment of the present invention.

As illustrated in FIG. 1, the power seat 12 according to the present exemplary embodiment includes a seat body 14. The seat body 14 includes a seat slide mechanism 20 that slides a seat cushion 16 along a seat front-rear direction with respect to a non-illustrated vehicle body floor portion, a recliner mechanism 22 that pivots a seat back 18 with respect to the seat cushion 16, and a lifter mechanism 24 that moves the seat cushion 16 in the up-down direction with respect to the vehicle body floor portion. Each of these mechanisms is a movement mechanism.

The power seat 12 also includes the power seat operation device 10, which is provided to a side portion 16A on the vehicle width direction outer side of the seat cushion 16. The power seat operation device 10 is a seat switch for selectively actuating the seat slide mechanism 20, the recliner mechanism 22, or the lifter mechanism 24, and the power seat operation device 10 is attached to the seat cushion 16 through a multi-shaft drive device 26 (see FIG. 2 to FIG. 5) installed inside the side portion 16A of the seat cushion 16.

The multi-shaft drive device 26 utilizes the driving force from a single non-illustrated motor to selectively drive the seat slide mechanism 20, the recliner mechanism 22, or the lifter mechanism 24. The multi-shaft drive device 26 configures a portion of the seat body 14. The multi-shaft drive device 26 is, for example, that described in International Publication (WO) No. 2012/077759, and is configured such the mechanical coupling state between the motor and each of the above movement mechanisms can be selectively switched by operation of the power seat operation device 10.

Power Seat Operation Device 10 Configuration

As illustrated in FIG. 2 to FIG. 8, relevant portions of the power seat operation device 10 are configured by a dial base 32 attached to the seat body 14, a dial 58 that is provided so as to be capable of rotational operation with respect to the dial base 32, a slider 78 that is supported by the dial 58 so as to be capable of sliding, a micro switch 94 that is attached to the dial 58, and a knob 110 that is provided so as to be capable of rotational operation with respect to the dial 58. The dial base 32 is formed in a disc shape, and is disposed at the seat width direction outer side of the multi-shaft drive device 26 in an orientation in which its axial direction is pointed in the seat width direction. A circular through hole 34 is formed in a central portion of the dial base 32.

Figure 6:
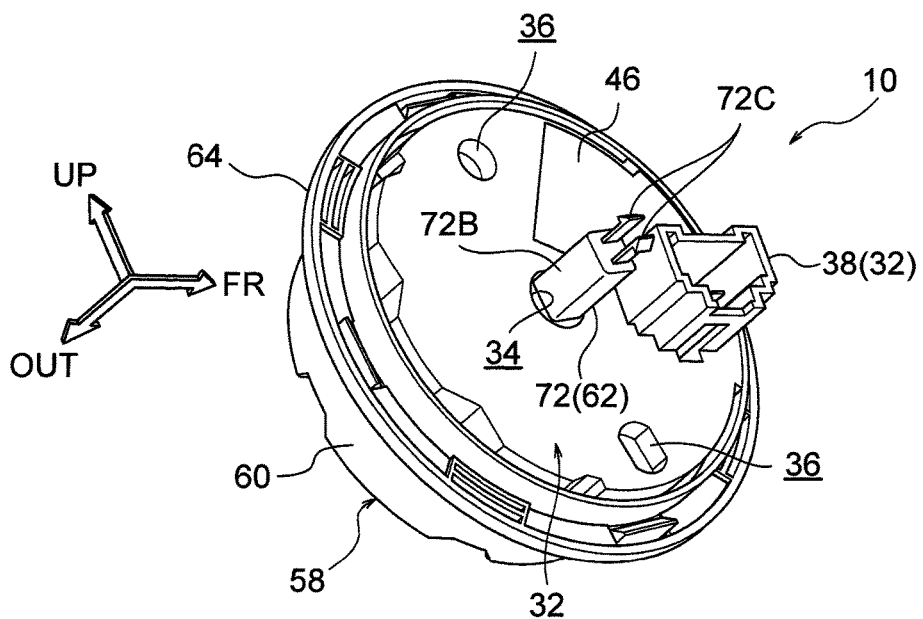
FIG. 6 is a perspective view of a power seat operation device as viewed from a back-face side.
Figure 8:
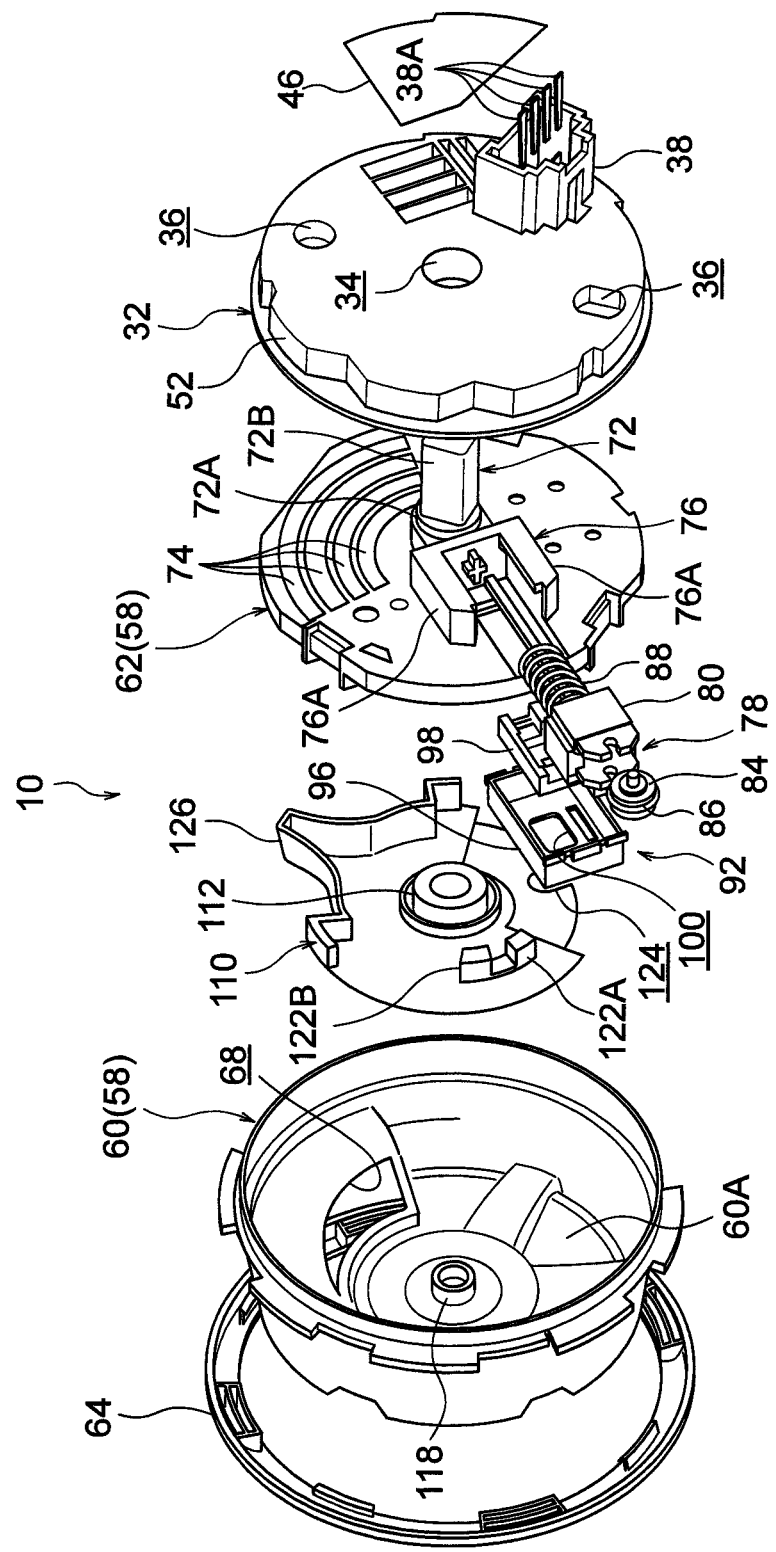
FIG. 8 is an exploded perspective view of a power seat operation device as viewed from a back-face side.

As illustrated in FIG. 6 and FIG. 8, a pair of recesses 36 are formed in a seat width direction inside face (the face on the multi-shaft drive device 26 side) of the dial base 32. The recesses 36 are positioned on diametrically opposite sides of the through hole 34. A pair of protrusions 28 provided to the multi-shaft drive device 26 fit into the recesses 36. Rotation of the dial base 32 with respect to the multi-shaft drive device 26 is restricted thereby. Note that the dial base 32 is configured such that axial direction movement with respect to the multi-shaft drive device 26 is restricted by a switch base 62, described below, thus fixing the dial base 32 so as to be incapable of relative movement with respect to the multi-shaft drive device 26.

A connector portion 38 is formed projecting from the seat width direction inside face of the dial base 32 toward the seat width direction inside. Configuration is such that the connector portion 38 is connected to a non-illustrated connector attached to a harness connected to the motor mentioned above. Thus, due to providing a connector to the dial base 32 fixed to the multi-shaft drive device 26, namely to the seat body 14, bending force is not input to the harness of the motor by rotational operation of the dial 58.

Figure 7:
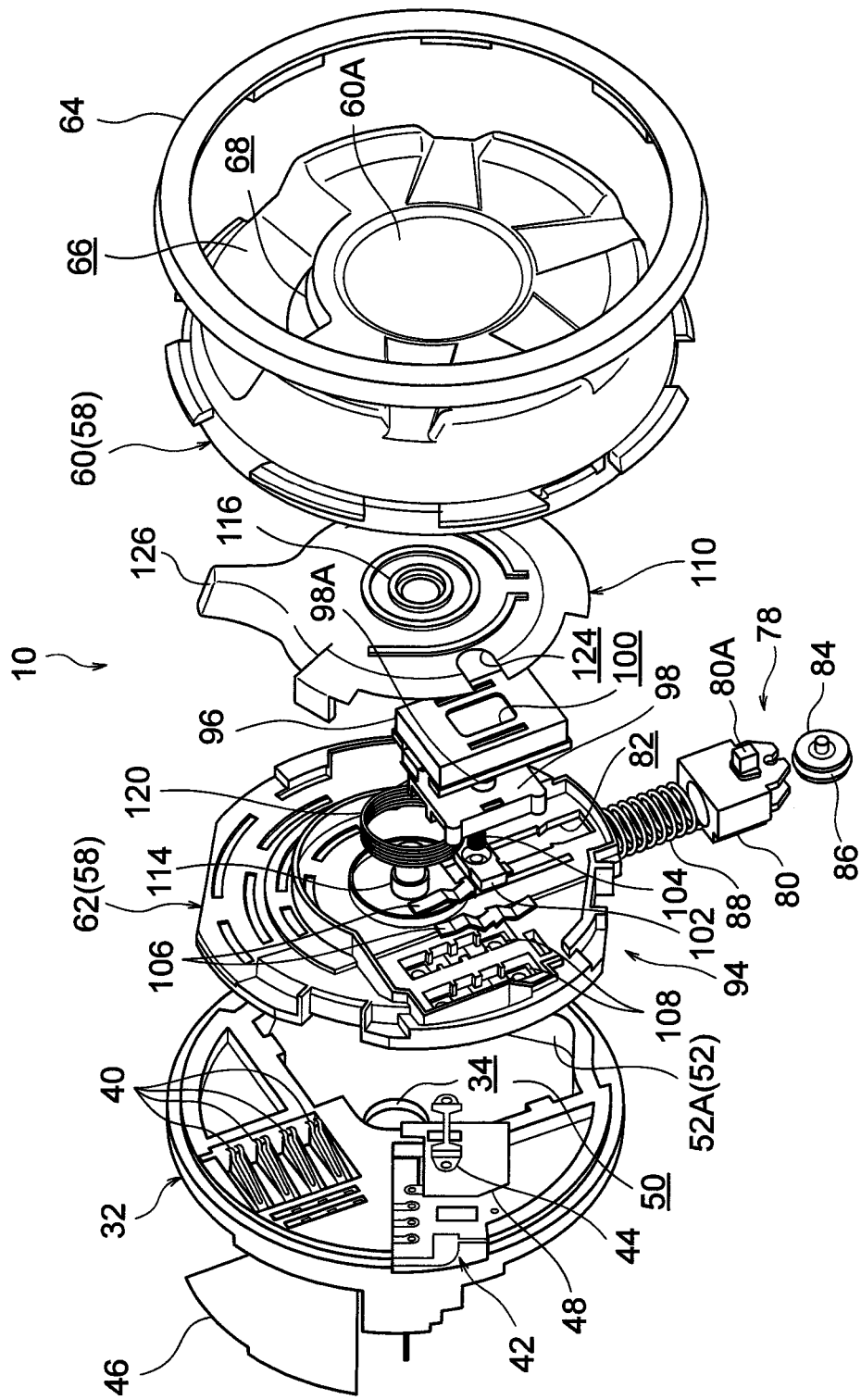
FIG. 7 is an exploded perspective view of a power seat operation device as viewed from a front-face side.
Figure 9:
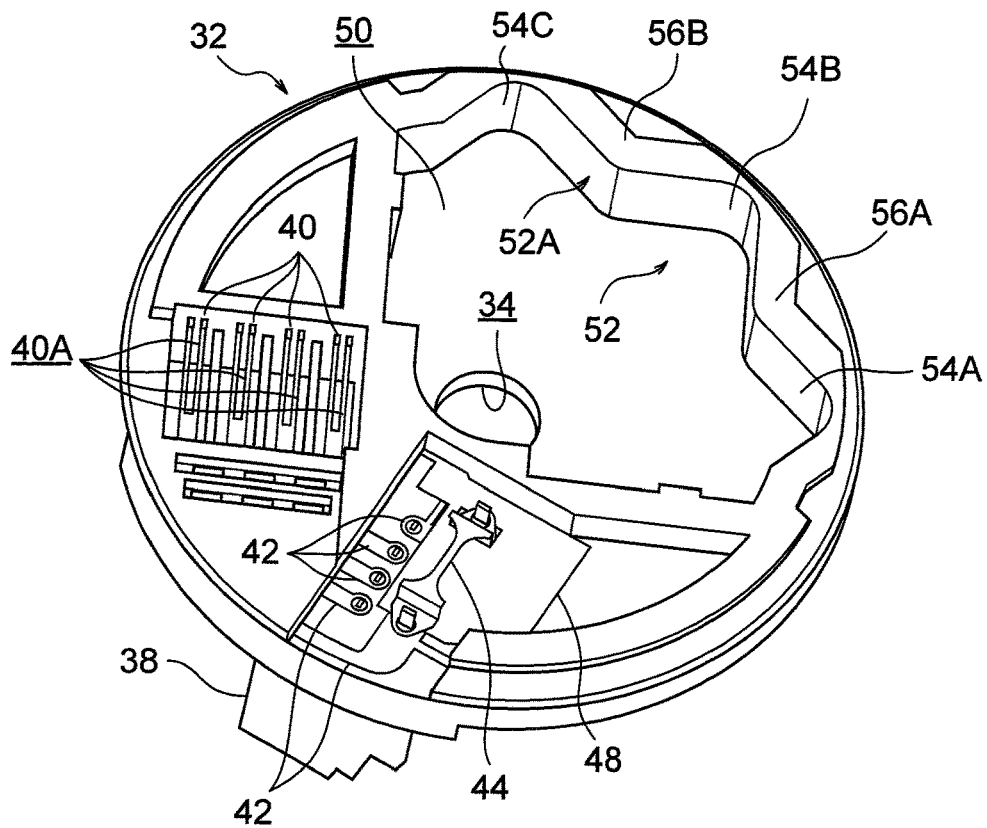
FIG. 9 is a perspective view of peripheral members of a power seat operation device, including a dial base, which is a configuration member of the power seat operation device.

As illustrated in FIG. 7 and FIG. 9, plural (herein, four) dial base contact terminals 40 are attached to one radial direction side of a seat width direction outer side face of the dial base 32. The plural dial base contact terminals 40 are formed in elongated shapes having their length directions along the circumferential direction of the dial base 32, and are side-by-side in the radial direction of the dial base 32. The plural dial base contact terminals 40 are electrically connected to plural connector terminals 38A provided to the connector portion 38 (see FIG. 8) through a wiring pattern 42. A fusible link plate 44 is attached to a midsection of the wiring pattern 42. Note that the members appended with reference numerals 46 and 48 in FIG. 7, FIG. 9, etc., are insulating seals.

In addition, a substantially folding-fan shaped recess 50, as viewed along the axial direction of the dial base 32, is formed to one radial direction side of the seat width direction outer side face of the dial base 32. The recess 50 is formed such that a dimension thereof along the circumferential direction of the dial base 32 increases on progression from the central side of the dial base 32, where the through hole 34 is formed, toward an outer peripheral side of the dial base 32. In the recess 50, a cam portion 52 that has an undulating shape is formed to an outer peripheral portion of the dial base 32. In the cam portion 52, plural (herein, three) valleys 54A, 54B, 54C and plural (herein, two) peaks 56A, 56B are formed alternately arranged in a row along the circumferential direction (the rotation direction of the dial 58) of the dial base 32 so as to form an undulation in the radial direction of the dial base 32. An undulating face 52A of the cam portion 52 faces the radial direction center of the dial base 32 and the dial 58.

The valleys 54A, 54B, 54C and the peaks 56A, 56B are formed in substantially triangular shapes as viewed along the axial direction of the dial base 32, thus configuring the cam portion 52 in substantially a wave shape. The valleys 54A, 54B, 54C are sunken toward the radial direction outer side (outer peripheral side) of the dial base 32. A dimension of the valleys 54A, 54B, 54C along the circumferential direction of the dial base 32 (a width dimension along the rotation direction of the dial 58) decreases on progression toward the radial direction outer side of the dial base 32. The peaks 56A, 56B project toward the radial direction center (central side) of the dial base 32. A dimension of the peaks 56A, 56B along the circumferential direction of the dial base 32 (a width dimension along the rotation direction of the dial 58) decreases on progression toward the radial direction center of the dial base 32. The bottoms of the valleys 54A, 54B, 54C and the apexes of the peaks 56A, 56B are each curved in a circular arc shape, as viewed along the axial direction of the dial base 32.

Figure 10:
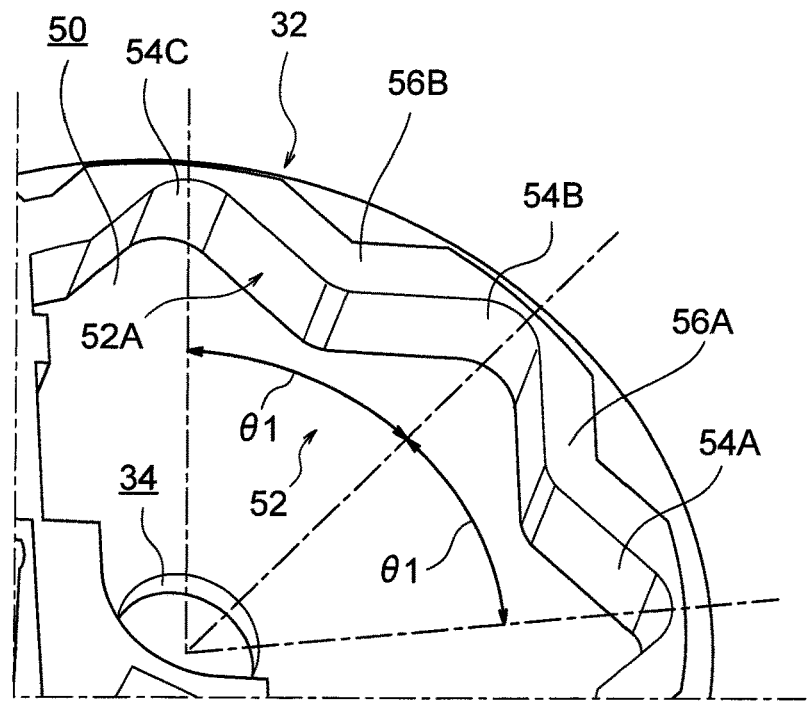
FIG. 10 is an enlarged perspective view in which a portion of FIG. 9 has been enlarged.

In the present exemplary embodiment, the valleys 54A, 54B, 54C are in a row along the circumferential direction of the dial base 32 at a pitch of 45° about the center of the dial base 32, and θ1 illustrated in FIG. 10 is set to 45°. Note that in the following explanation, the valleys 54A, 54B, 54C are sometimes referred to as valleys 54, and the peaks 56A, 56B are sometimes referred to as peaks 56. The dial 58 is disposed at the seat width direction outer side of the dial base 32 configured as described above.

As illustrated in FIG. 7 and FIG. 8, the dial 58 is configured by a bottomed, substantially circular-tube shaped dial body 60 that is open toward the seat width direction inside (at the dial base 32 side), and a substantially disc shaped switch base 62. The dial body 60 is disposed coaxially with the dial base 32, in an orientation in which its axial direction runs along the seat width direction and in which its opening faces the seat width direction inside. The dial base 32 is disposed inside the opening of the dial body 60, and a ring shaped cover 64 is mounted to an outer peripheral portion of the dial body 60. A substantially trapezoid shaped recess 66, as viewed along the axial direction of the dial 58, is formed in part of the outer peripheral portion of the dial body 60. A substantially rectangular knob-insertion hole 68 that is open in the radial direction of the dial body 60 is formed in the recess 66.

The switch base 62 is disposed between the dial body 60 and the dial base 32. The switch base 62 it fitted to the inside of the dial body 60, and plural hooks formed at an inner peripheral portion of the dial body 60 hook onto an outer peripheral portion of the switch base 62. Thereby, the switch base 62 is coaxially and integrally attached to the dial body 60.

Figure 11:
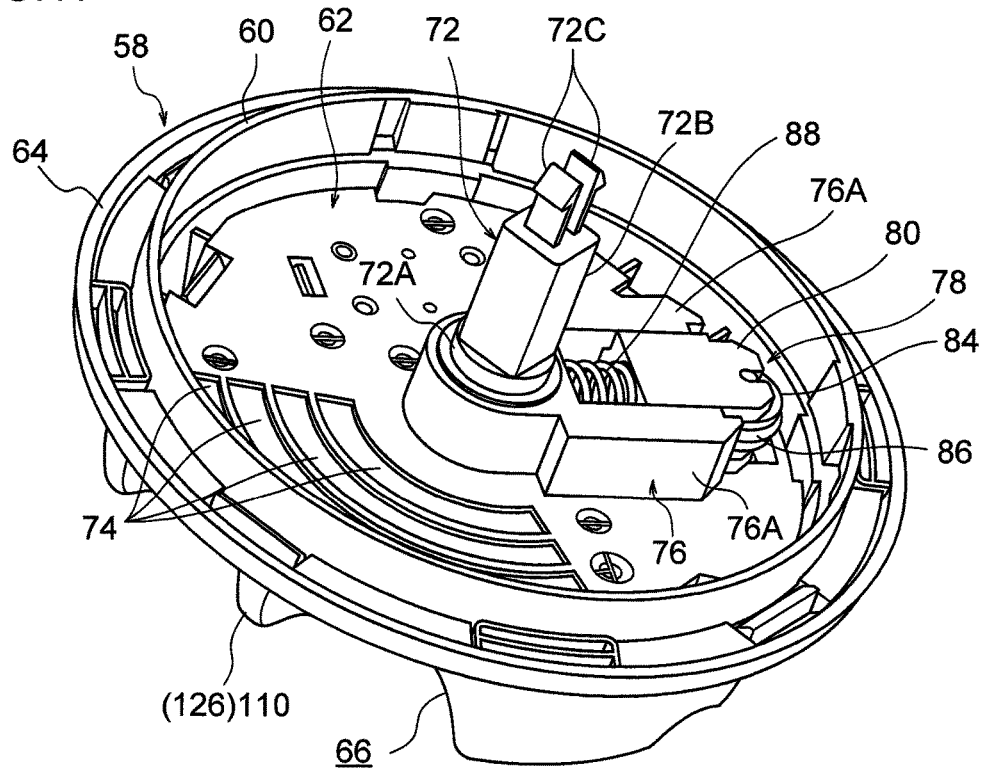
FIG. 11 is a perspective view of peripheral members of a power seat operation device, including a dial and a slider, which are configuration members of the power seat operation device.
Figure 12:
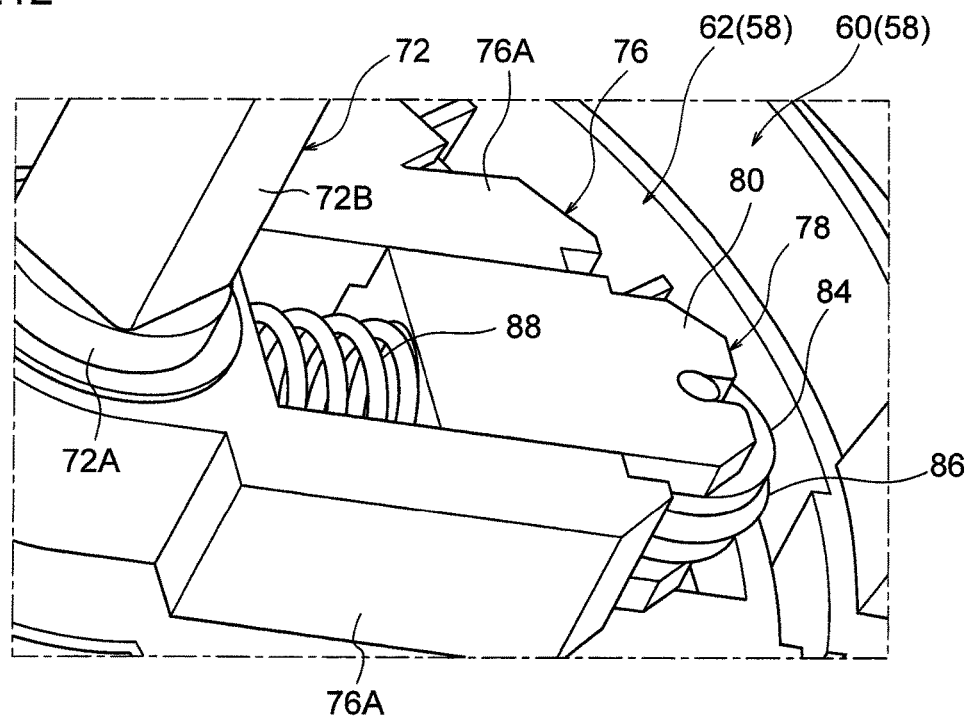
FIG. 12 is an exploded perspective view in which a portion of FIG. 11 has been enlarged.

As illustrated in FIG. 8 and FIG. 11, a coupling shaft 72 that projects toward the seat width direction inside is coaxially formed at a central portion of the switch base 62. A base end portion of the coupling shaft 72 is disposed inside the recess 50 of the dial base 32. A support shaft portion 72A formed in a circular column shape is provided at the base end side of the coupling shaft 72. The support shaft portion 72A is fitted into the through hole 34 of the dial base 32 so as to enable rotation thereof. The switch base 62, namely the dial 58, is supported thereby so as to be capable of rotating with respect to the dial base 32. Further, an angular column portion 72B formed in an angular column shape is provided further toward a leading end side of the coupling shaft 72 than the support shaft portion 72A, and a pair of hooks 72C that project from a leading end of the angular column portion 72B are provided at leading end side of the coupling shaft 72.

The angular column portion 72B projects further toward the seat width direction inside than the dial base 32, and corresponds to an operation shaft 30 (see FIG. 5) included in the multi-shaft drive device 26 described above. A square shaped coupling hole 30A, as viewed along the seat width direction, is formed in the operation shaft 30. The angular column portion 72B is inserted into the coupling hole 30A mentioned above, and the pair of hooks 72C hook onto the operation shaft 30 from the inner side of the coupling hole 30A. The power seat operation device 10 is thereby coupled to the multi-shaft drive device 26 so as to be incapable of relative movement in the axial direction. Further, the switch base 62 is coupled to the operation shaft 30 so as to be incapable of relative movement in the axial direction and so as to be capable of rotating as a unit together with the operation shaft 30. Configuration is such that manual rotational operation of the dial 58 causes the multi-shaft drive device 26 to switch the mechanical coupling state between the motor and each of the above movement mechanisms.

Figure 4:
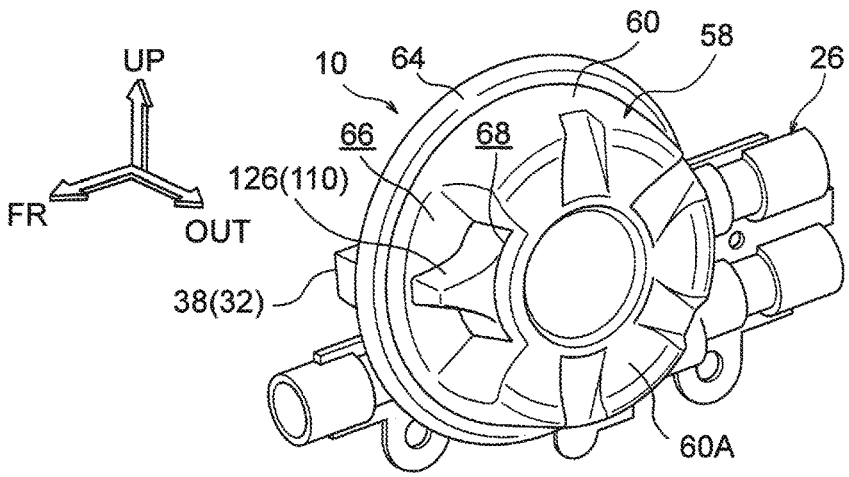
FIG. 4 is a perspective view corresponding to FIG. 2 illustrating a state in which the dial is positioned at a lifter operation position.
Figure 5:
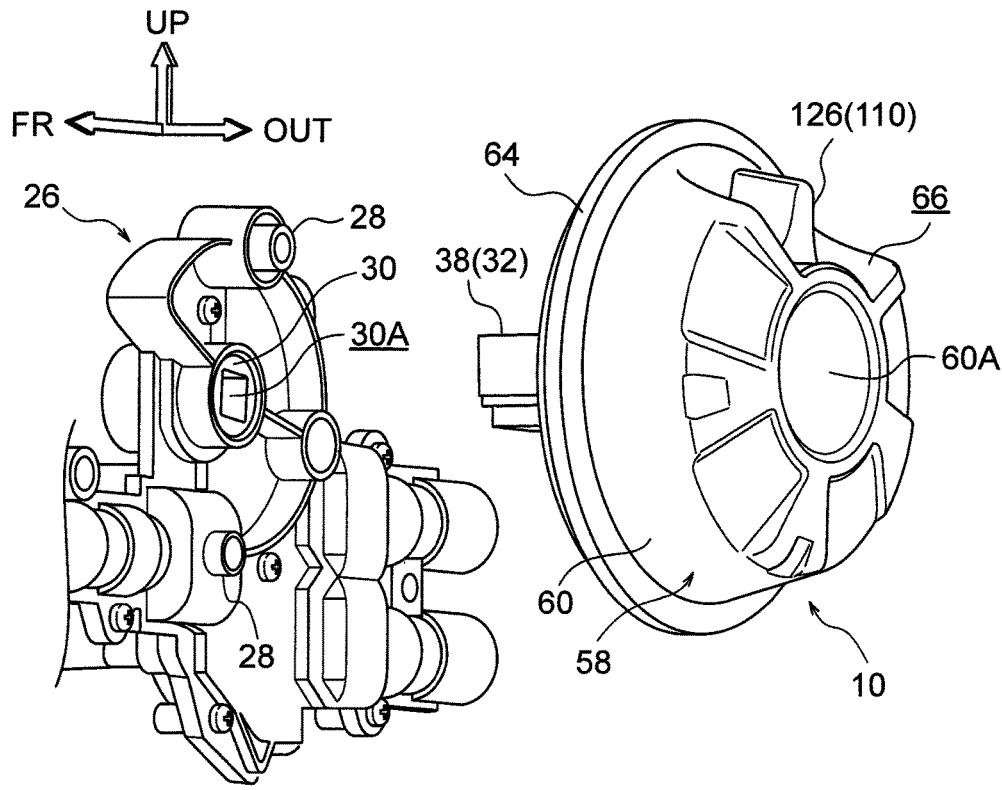
FIG. 5 is a perspective view illustrating a state in which a power seat operation device has been removed from a multi-shaft drive device.

Specifically, the dial 58 is able to be rotationally operated between plural rotary positions with respect to the dial base 32, namely the seat body 14, the positions being a slide operation position (the position illustrated in FIG. 2), a recliner operation position (the position illustrated in FIG. 3), and a lifter operation position (the position illustrated in FIG. 4). In a state in which the dial 58 is positioned at the slide operation position, the motor and the seat slide mechanism 20 are mechanically coupled. In a state in which the dial 58 is positioned at the recliner operation position, the motor and the recliner mechanism 22 are mechanically coupled. In a state in which the dial 58 is positioned at the lifter operation position, the motor and the lifter mechanism 24 are mechanically coupled. Note that in the present exemplary embodiment, the angle of rotation of the dial 58 between the slide operation position and the recliner operation position and the angle of rotation of the dial 58 between the recliner operation position and the lifter operation position are both set to 45°.

As illustrated in FIG. 8, plural (herein, four) terminals 74 are attached to one radial direction side of the seat width direction inside face (the face on the dial base 32 side) of the switch base 62. The plural terminals 74 are curved in concentric circular arc shapes around the switch base 62, and are disposed side-by-side in the radial direction of the switch base 62. The plural terminals 74 are normally in slidable contact with the plural dial base contact terminals 40 described above such that the plural terminals 74 and the plural dial base contact terminals 40 are electrically connected together.

Note that the plural dial base contact terminals 40 are split into forked shapes by grooves 40A (see FIG. 9; these reference numerals are omitted outside of FIG. 9) formed at width direction central portions of the dial base contact terminals 40. Thus, configuration is such that abraded powder produced by sliding of the terminals 74 against the dial base contact terminals 40 is released from the width direction central portions of the dial base contact terminals 40 so as to stabilize the contact between the terminals 74 and the dial base contact terminals 40.

Further, a slider support portion 76 is formed at the other radial direction side of the seat width direction inside face (the face on the dial base 32 side) of the switch base 62. The slider support portion 76 includes a pair of side-wall portions 76A (see FIG. 11 and FIG. 12) that project toward the dial base 32 side. The pair of side-wall portions 76A face each other in the circumferential direction of the switch base 62, and are configured so as to be integral with the base end portion of the coupling shaft 72 described above at the central side of the switch base 62. The slider support portion 76 is disposed inside the recess 50 of the dial base 32 and supports a slider 78.

The slider 78 is formed in a substantial block shape using resin, for example, and includes a body portion 80 fitted between the pair of side-wall portions 76A. The body portion 80 is supported by the pair of side-wall portions 76A so as to be capable of sliding in the radial direction of the switch base 62 and so as to be non-removable in the axial direction of the switch base 62. As illustrated in FIG. 7, an angular column shaped knob engagement portion (protrusion) 80A that projects toward the switch base 62 side (the seat width direction outer side) is formed to the body portion

80. The knob engagement portion 80A is inserted into a rectangular through hole 82 formed in the switch base 62, and projects to the seat width direction outer side of the switch base 62. The through hole 82 extends along the radial direction of the switch base 62, and is formed so as to permit sliding of the body portion 80 with respect to the switch base 62.

A roller 84 is attached to a leading end portion of the body portion 80 (a radial direction outer side end portion of the dial 58). The roller 84 is supported so as to be capable of rotating with respect to the slider 78 about an axis running along the seat width direction. A sound-damping rubber ring 86 (reference numeral omitted in FIG. 13A to FIG. 13F) that has been formed into a ring shape from rubber is mounted to an outer peripheral portion of the roller 84.

A roller spring 88 serving as an elastic member is installed between the pair of side-wall portions 76A and between the body portion 80 of the slider 78 and the base end portion of the coupling shaft 72. The roller spring 88 is a compression coil spring, and biases the slider 78 toward the radial direction outer side of the dial 58. The roller 84 of the slider 78 thereby elastically abuts (is pressed against) the undulating face 52A of the cam portion 52 described above through the rubber ring 86. Configuration is such that the slider 78 fits into one out of the plural valleys 54A, 54B, 54C so as to retain the dial 58 at one out of the plural rotary positions.

Figure 2:
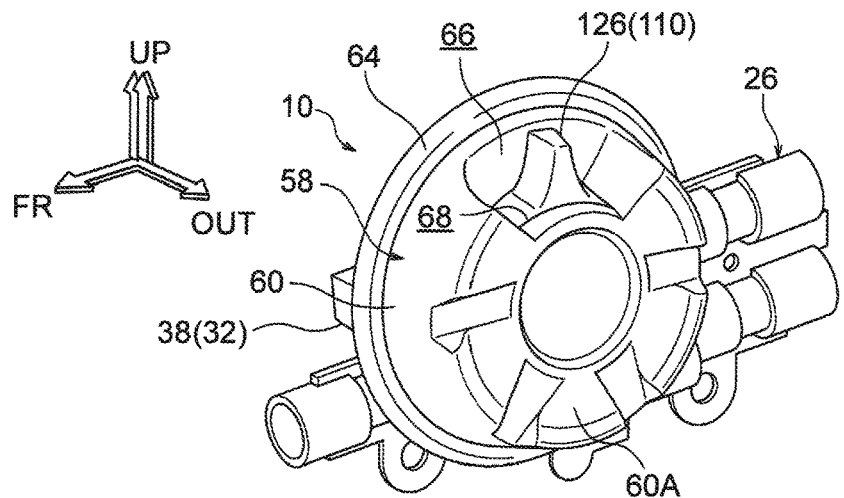
FIG. 2 is a perspective view of a power seat operation device and a multi-shaft drive device included in the same power seat, and illustrates a state in which a dial included in the power seat operation device is positioned at a slide operation position.
Figure 3:
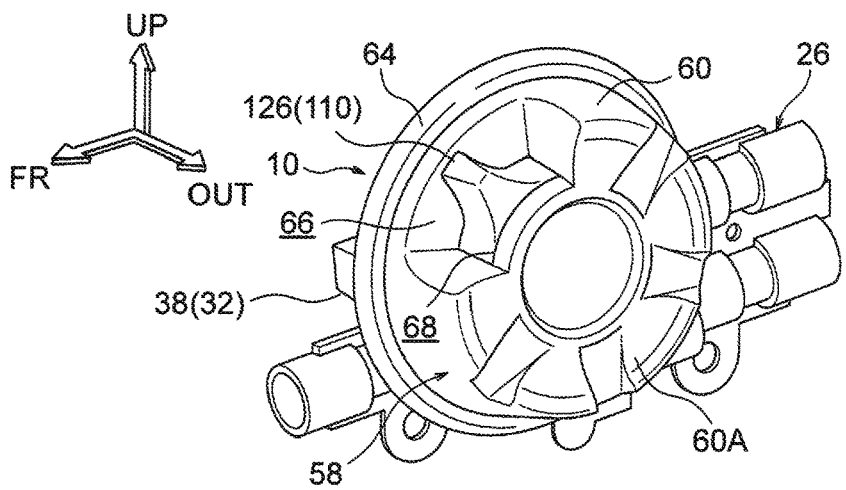
FIG. 3 is a perspective view corresponding to FIG. 2 illustrating a state in which the dial is positioned at a recliner operation position.

Specifically, fitting the slider 78 into the valley 54A retains the dial 58 at the slide operation position (the position illustrated in FIG. 2). Fitting the slider 78 into the valley 54B retains the dial 58 at the recliner operation position (the position illustrated in FIG. 3). Fitting the slider 78 into the valley 54C retains the dial 58 at the lifter operation position (the position illustrated in FIG. 4).

When the dial 58 is rotationally operated, the roller 84 and the rubber ring 86 of the slider 78 roll over the undulating face 52A of the cam portion 52. The slider 78 then moves along the undulating face 52A of the cam portion 52 while elastically deforming the roller spring 88 and sliding in the radial direction with respect to the dial 58.

Figure 13A:
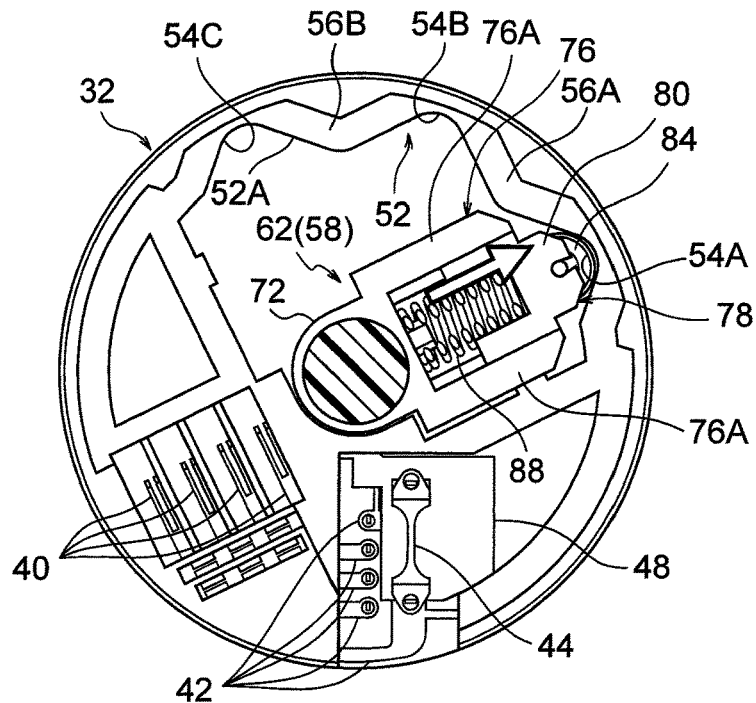
FIG. 13A is a partial cross-section for explaining the relationship of a dial and a slider with a cam portion of a dial base, and illustrates a state in which the dial is positioned at a slide operation position.
Figure 13B:
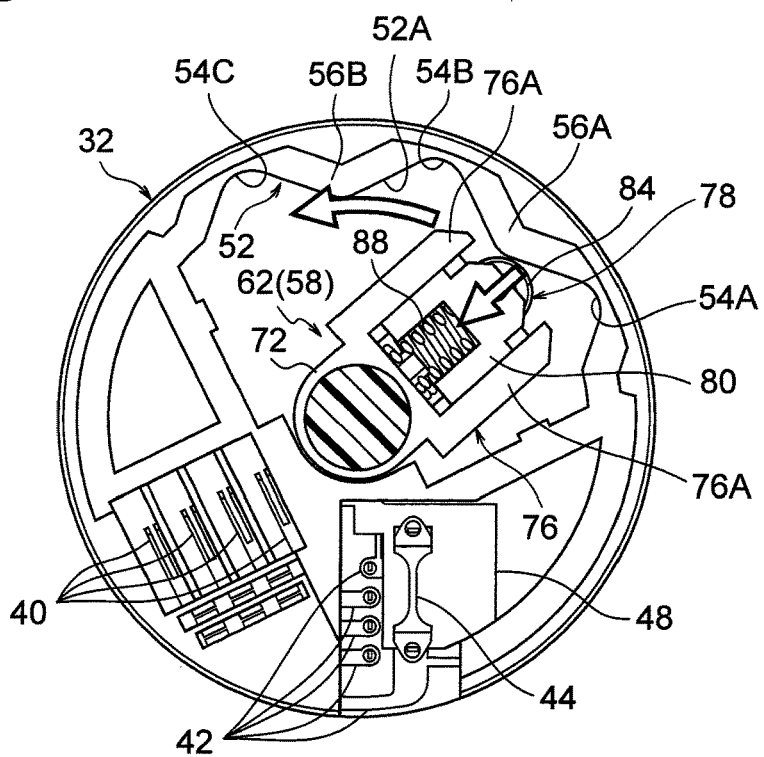
FIG. 13B is a partial cross-section corresponding to FIG. 13A illustrating a state in which a dial is in the middle of being rotationally operated from a slide operation position to a recliner operation position.

For example, in a state in which the slider 78 has been fitted into the valley 54A as illustrated in FIG. 13A, namely in a state in which the dial 58 is positioned at the slide operation position, when the dial 58 is rotationally operated from the slide operation position to the recliner operation position, the inclined face of the peak 56A presses the roller 84 toward the radial direction center of the dial 58 as illustrated in FIG. 13B such that the slider 78 slides toward the radial direction center of the dial 58 while compressively deforming the roller spring 88.

Figure 13C:
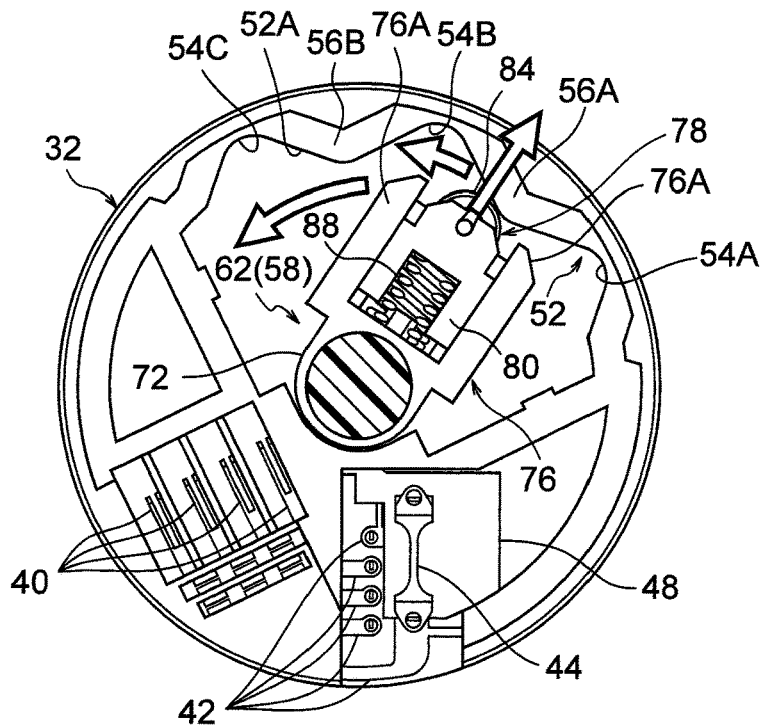
FIG. 13C is a partial cross-section corresponding to FIG. 13A for explaining a state when a dial is automatically moved from a position midway between a recliner operation position and a slide operation position to the recliner operation position.

Then, when the roller 84 crosses the apex of the peak 56A as illustrated in FIG. 13C, the slider 78 moves toward the bottom side of the valley 54B while sliding toward the radial direction outer side of the dial 58 due to elastic recovery force from the roller spring 88. The slider 78 thus crosses over the peak 56A and is fitted inside the valley 54B. When this occurs, the production of noise is prevented due to the rubber ring 86 abutting the bottom of the valley 54B. Similar applies when the slider 78 is fitted inside the valley 54A or the valley 54C.

As described above, when the slider 78 crosses over the peak 56A, the roller spring 88 undergoes compressive deformation. Thus, in cases in which an operator rotationally operating the dial 58 has removed their hand from the dial 58 at a midway position between the slide operation position and the recliner operation position (at an intermediate position), the slider 78 is fitted into the nearby valley 54A or valley 54B by elastic recovery force from the roller spring 88. The dial 58 is thus configured to automatically move to either the recliner operation position or the slide operation position, which are each one of the plural rotary positions.

Figure 13D:
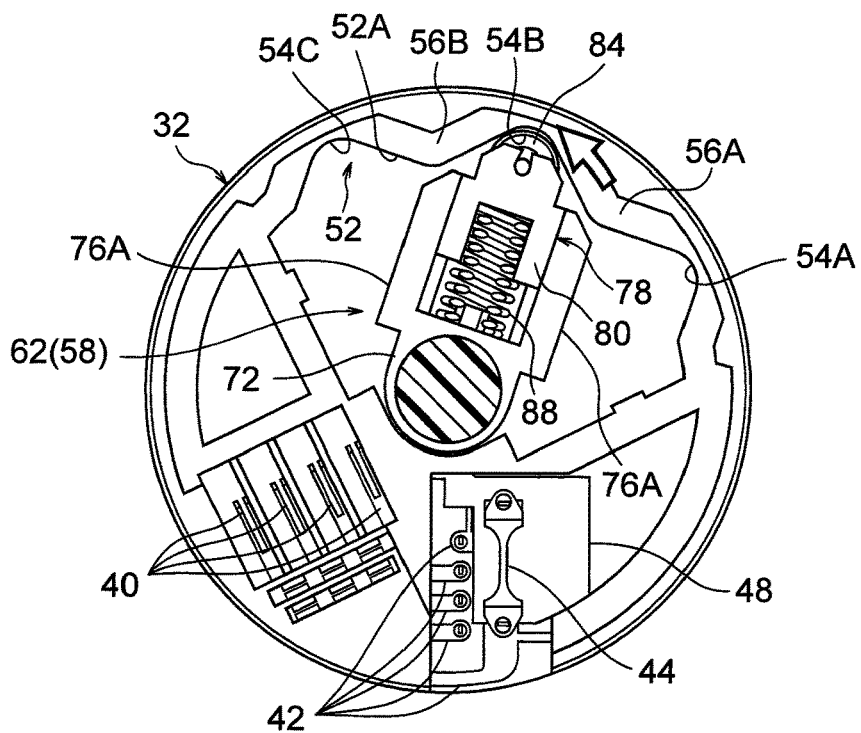
FIG. 13D is a partial cross-section corresponding to FIG. 13A illustrating a state in which a dial has been moved to a recliner operation position.
Figure 13E:
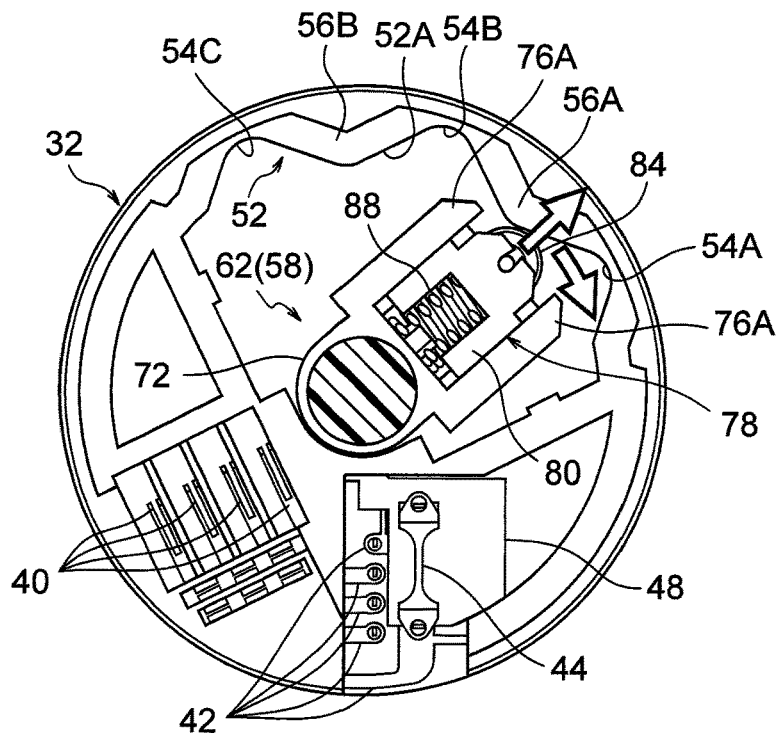
FIG. 13E is a partial cross-section corresponding to FIG. 13A for explaining a state when a dial is automatically moved from a position midway between a recliner operation position and a slide operation position to the slide operation position.
Figure 13F:
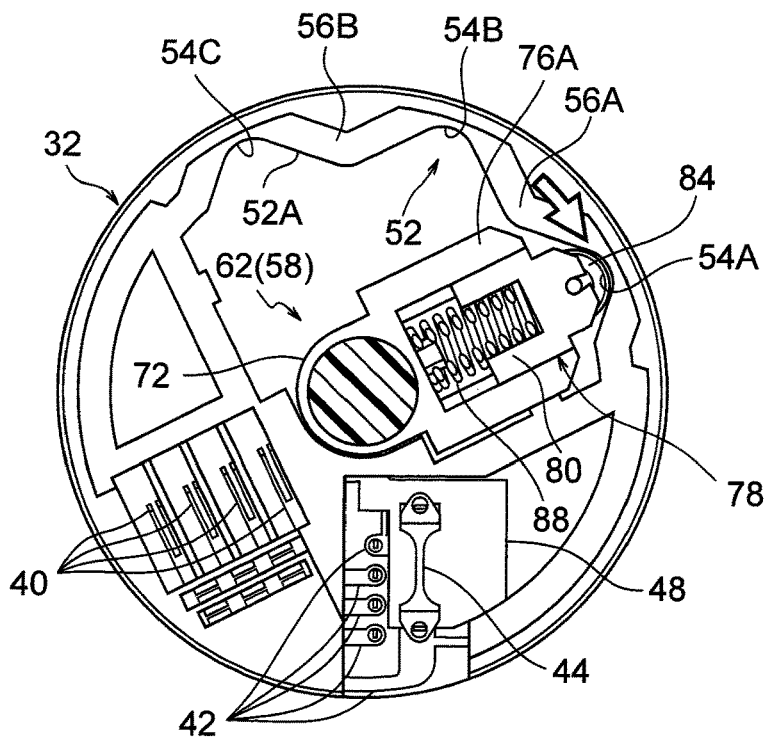
FIG. 13F is a partial cross-section corresponding to FIG. 13A illustrating a state in which a dial has been moved to a slide operation position.
Figure 14:
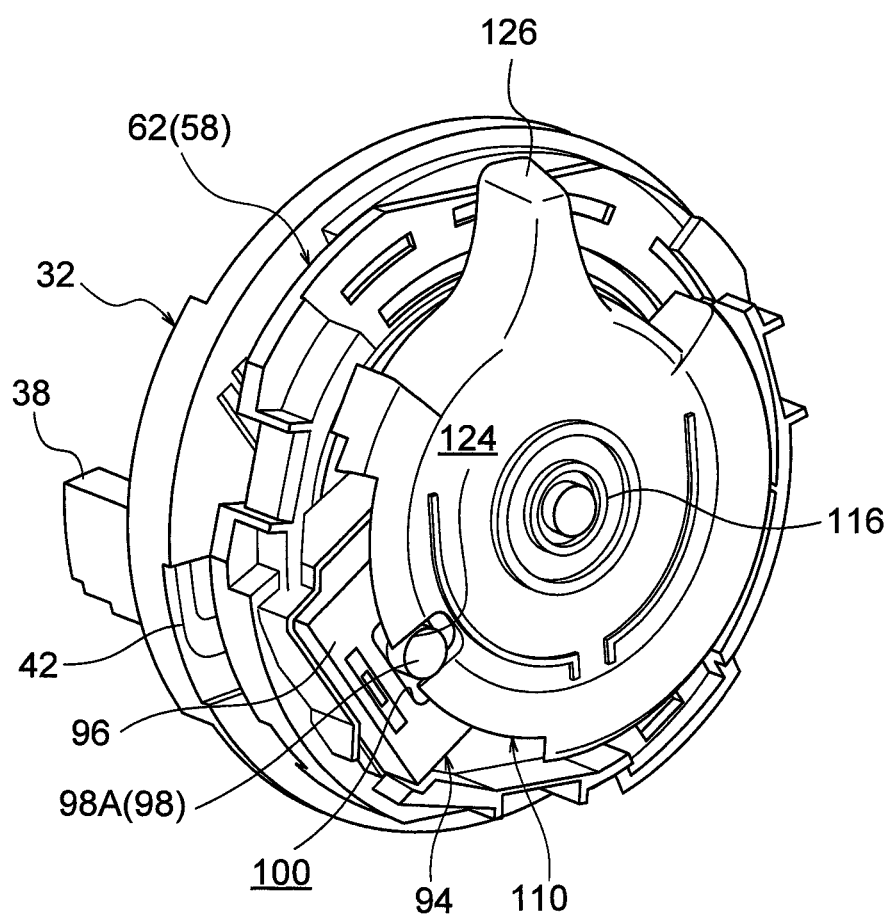
FIG. 14 is a perspective view illustrating a state in which a dial body and a cover have been removed from a power seat operation device.
Figure 15:
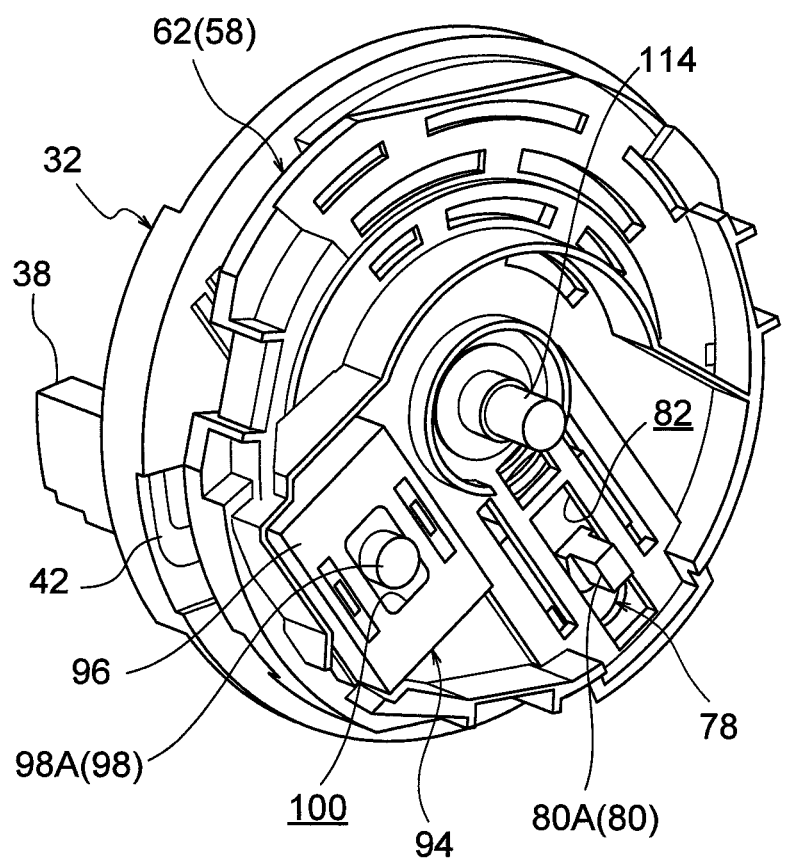
FIG. 15 is a perspective view illustrating a state in which a knob is also removed from the configuration illustrated in FIG. 14.

Namely, when an operator has removed their hand from the dial 58 at, for example, the position illustrated in FIG. 13C, the slider 78 is fitted into the nearby valley 54B by elastic recovery force from the roller spring 88 (see FIG. 13D). The dial 58 thus automatically moves to the recliner operation position. In addition, when an operator has removed their hand from the dial 58 at, for example, the position illustrated in FIG. 13E, the slider 78 is fitted into the nearby valley 54A by elastic recovery force from the roller spring 88 (see FIG. 13F). The dial 58 thus automatically moves to the slide operation position.

Note that although omitted from illustration in the drawings, when the dial 58 is rotationally operated between the recliner operation position and the lifter operation position, the slider 78 crosses over the peak 56B while compressively deforming the roller spring 88 and sliding in the radial direction with respect to the dial 58. In cases in which an operator has removed their hand from the dial 58 midway through such rotational operation, the slider 78 is fitted into the nearby valley 54B or valley 54C by elastic recovery force from the roller spring 88. The dial 58 is thus configured to automatically move to either the lifter operation position or the recliner operation position, which are each one of the plural rotary positions.

As illustrated in FIG. 7, a knob support shaft 114 that projects toward the seat width direction outer side is coaxially formed at a central portion of the switch base 62. A leading end portion of the knob support shaft 114 is fitted inside a circular tube shaped support portion 118 formed in a central portion of a bottom wall 60A of the dial body 60. The micro switch 94 is installed on one radial direction side of the seat width direction outer side face of the switch base 62.

As illustrated in FIG. 7, FIG. 8, FIG. 14, and FIG. 15, the micro switch 94 is configured by a switch cover 96, a switch knob 98, a switch push-lock pin 102, a switch spring 104, a pair of switch contact terminals 106, and contacts 108. The switch cover 96 is formed in a box shape that is open at the switch base 62 side, and the switch cover 96 is attached to the switch base 62 by hook fittings. The switch knob 98 is housed inside the switch base 62.

The switch knob 98 is formed in substantially a box shape that is open at the switch base 62 side, and the switch knob 98 is supported with respect to the switch base 62 so as to be capable of sliding in the radial direction of the switch base 62. A projection 98A that projects toward the seat width direction outer side is provided to the switch knob 98. The projection 98A passes through a rectangular through hole 100 formed in a bottom wall of the switch cover 96 and projects toward the seat width direction outer side of the switch cover 96. The switch push-lock pin 102 and the switch spring 104 are disposed between the switch knob 98 and the switch base 62.

The switch push-lock pin 102 is formed in a block shape, and is biased toward the switch base 62 side by the switch spring 104, which is a compression coil spring. The pair of switch contact terminals 106 are disposed between the switch push-lock pin 102 and the switch base 62. The pair of switch contact terminals 106 make contact with the contacts 108 attached to the switch base 62. The state of contact between the pair of switch contact terminals 106 and the contacts 108 is switched as a result of the switch knob 98 sliding in the radial direction of the switch base 62 with respect to the switch cover 96. The contacts 108 are electrically connected to the terminals 74 described above, and are configured such that the motor of the multi-shaft drive device 26 is actuated by the above switching.

The micro switch 94 configured as described above is reliable and versatile, enables tolerance to temperature changes to be ensured, and also contributes to the reduction of production costs due to its simple structure. The micro switch 94 is configured so as to be operated by the knob 110.

As illustrated in FIG. 7 and FIG. 8, the knob 110 is formed in substantially a disc shape, and the knob 110 is housed inside the dial body 60. As illustrated in FIG. 8, a circular tube shaped boss portion 112 that projects toward the switch base 62 side is formed at a central portion of the knob 110. The circular column shaped knob support shaft 114 that projects from the central portion of the switch base 62 fits inside the boss portion 112 so as to enable rotation thereof. As illustrated in FIG. 7, a ring shaped rotation support portion 116 that projects toward the bottom wall 60A side of the dial body 60 is formed at the central portion of the knob 110. The circular tube shaped support portion 118 formed at the central portion of the bottom wall 60A of the dial body 60 fits inside the rotation support portion 116 so as to enable rotation thereof. The switch knob 98 is supported thereby so as to be coaxial with the dial 58 and capable of relative rotation with respect to the dial 58.

A knob spring 120 spans between the knob 110 and the switch base 62. The knob spring 120 is a torsion coil spring, and is disposed coaxially with the knob 110 and the switch base 62. The knob spring 120 biases the knob 110 toward the neutral position illustrated in FIG. 14 and FIG. 16A with respect to the switch base 62. Thus, when operational force is not being input to the knob 110, which is normally the case, the knob 110 is retained at the above-described neutral position with respect to the switch base 62.

Figure 16A:
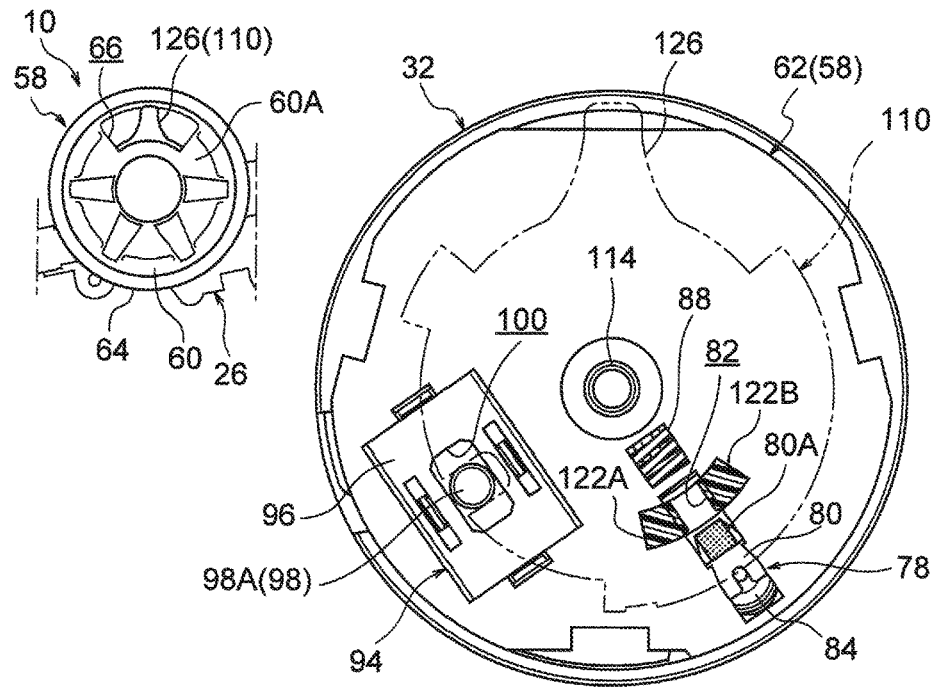
FIG. 16A is a partial cross-section for explaining the relationship between a pair of slider engagement portions of a knob and a knob engagement portion of a slider, and is a diagram illustrating a state in which the dial and the knob are not being operated.

A pair of substantially angular column shaped slider engagement portions 122A, 122B are formed projecting toward the seat width direction inside (the switch base 62 side) at the outer peripheral side of the knob 110. The pair of slider engagement portions 122A, 122B face each other across a gap in the rotation direction (circumferential direction) of the knob 110. The pair of slider engagement portions 122A, 122B are curved so as to follow the rotation direction of the knob 110, as viewed along the axial direction of the knob 110. As illustrated in FIG. 16A and FIG. 17, the pair of slider engagement portions 122A, 122B are disposed proximate to the center of the knob 110 with respect to the knob engagement portion 80A of the slider 78 described above. In a state in which the knob 110 is positioned at the neutral position, configuration is such that the gap (space) between the pair of slider engagement portions 122A, 122B opposes the knob engagement portion 80A from toward the radial direction center of the knob 110 (see FIG. 18A). Note that in FIG. 16A to FIG. 16D, the knob engagement portion 80A is dotted to facilitate recognition of the knob engagement portion 80A.

A notch 124 is formed in outer peripheral portion of the knob 110. The projection 98A of the switch knob 98 is disposed inside the notch 124. An operation portion 126 that projects toward the radial direction outer side of the knob 110 is formed at the outer peripheral portion of the knob 110. The operation portion 126 penetrates the knob-insertion hole 68 of the dial body 60 so as to project to the outside of the dial body 60, and is disposed inside the recess 66 of the dial body 60. Configuration is such that the knob 110 is rotationally operated using the operation portion 126.

Figure 16B:
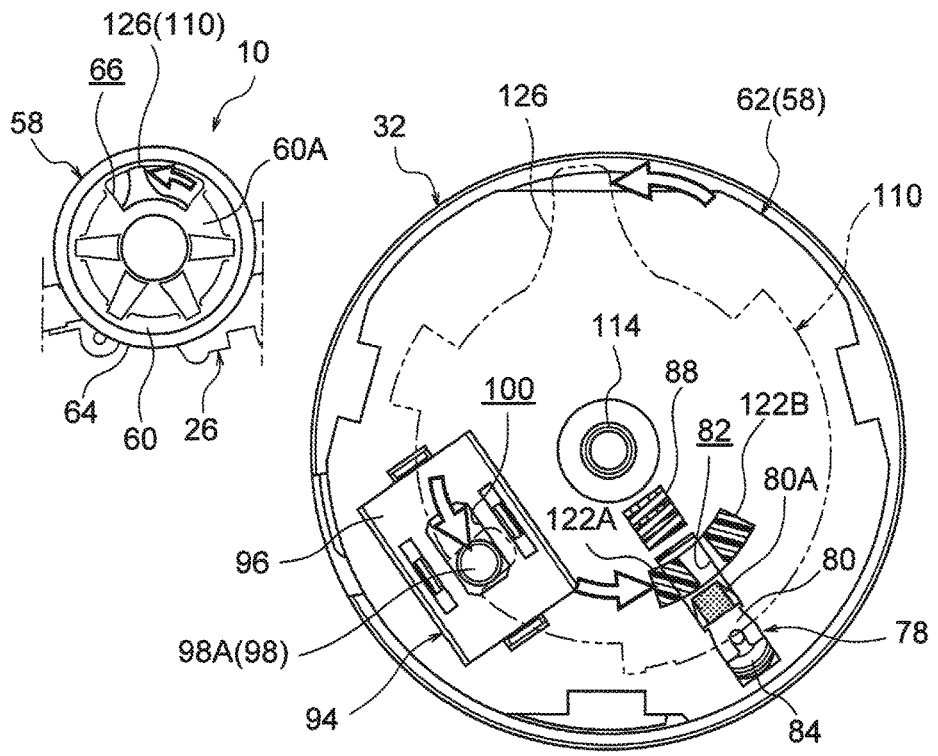
FIG. 16B is a partial cross-section illustrating a state in which a knob has been rotationally operated toward one side.

Specifically, as illustrated in FIG. 16B, operation of the operation portion 126 toward one side in the circumferential direction with respect to the dial 58 rotates the knob 110 toward the one circumferential direction side with respect to the dial 58 and slides the switch knob 98 toward the one circumferential direction side with respect to the dial 58. The motor of the multi-shaft drive device 26 thereby rotates forward. The one slider engagement portion 122A is configured so as to approach and oppose the knob engagement portion 80A from toward the radial direction center of the knob 110 in this state (see FIG. 18B).

Figure 16C:
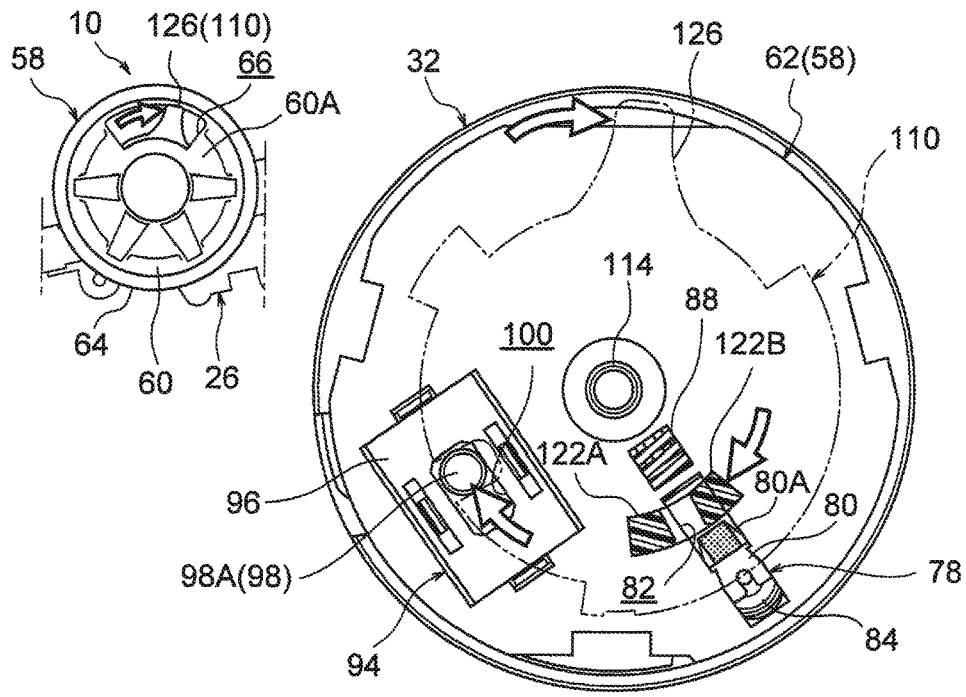
FIG. 16C is a partial cross-section illustrating a state in which a knob has been rotationally operated toward another side.

As illustrated in FIG. 16C, operation of the operation portion 126 toward the other side in the circumferential direction with respect to the dial 58 rotates the knob 110 toward the other circumferential direction side with respect to the dial 58 and slides the switch knob 98 toward the other circumferential direction side with respect to the dial 58. The motor of the multi-shaft drive device 26 thereby rotates in reverse. The other slider engagement portion 122B is configured so as to approach and oppose the knob engagement portion 80A from toward the radial direction center of the knob 110 in this state.

Figure 16D:
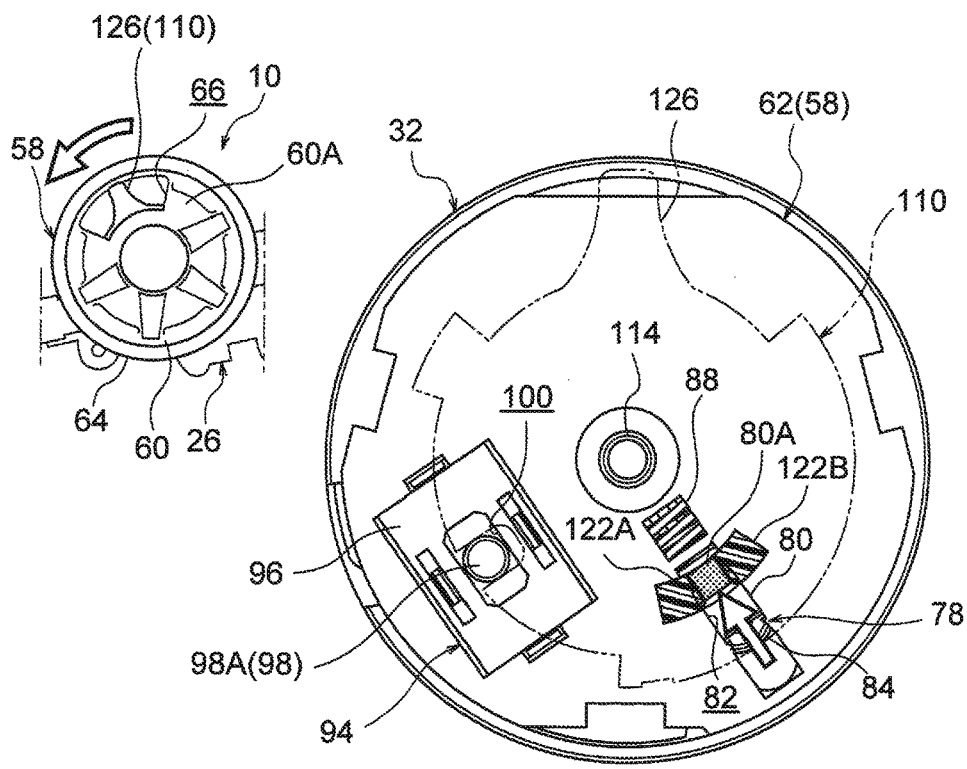
FIG. 16D is a partial cross-section illustrating a state in which a dial is in the middle of being rotationally operated.
Figure 18A:
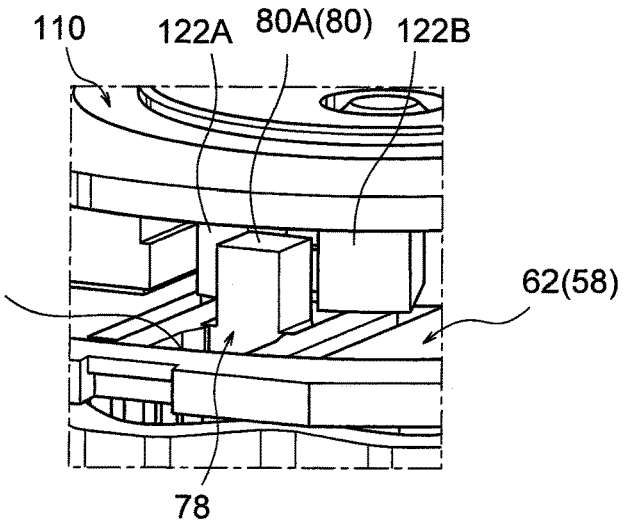
FIG. 18A is a perspective view of the configuration illustrated in FIG. 17, as viewed from a different angle than that of FIG. 17.
Figure 18B:
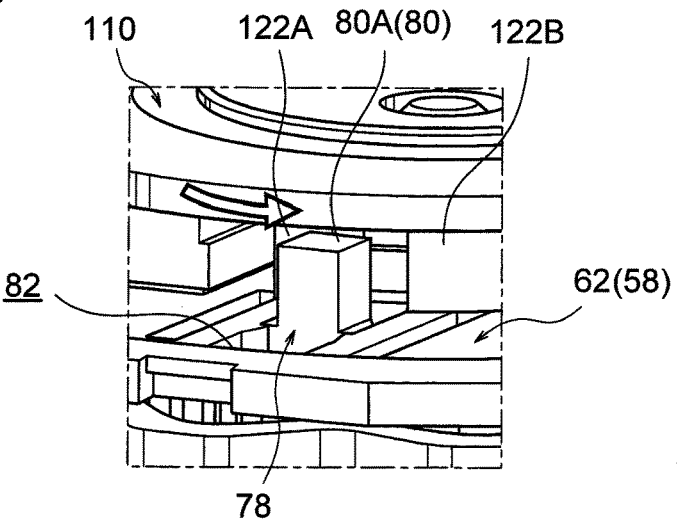
FIG. 18B is a perspective view corresponding to FIG. 18A illustrating a state in which a knob has been rotationally operated toward one side.
Figure 18C:
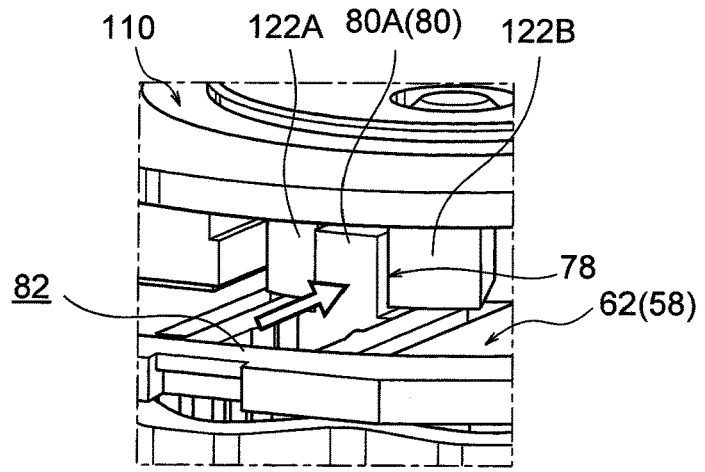
FIG. 18C is a perspective view corresponding to FIG. 18A illustrating a state in which a dial is in the middle of being rotationally operated.

As illustrated in FIG. 16D and FIG. 18C, when the slider 78 is slid with respect to the dial 58 toward the radial direction center by rotational operation of the dial 58, configuration is such that the knob engagement portion 80A is disposed (inserted) between the pair of slider engagement portions 122A, 122B.

Operation and Advantageous Effects

Explanation follows regarding operation and advantageous effects of the present exemplary embodiment.

In the power seat 12 configured as described above, when the dial 58 of the power seat operation device 10 is rotationally operated to one out of the plural rotary positions (the slide operation position, the recliner operation position, or the lifter operation position) with respect to the dial base 32, one of the plural movement mechanisms (the seat slide mechanism 20, the recliner mechanism 22, or the lifter mechanism 24) is selected as an operation target. Then, when the knob 110 provided to the dial 58 is rotationally operated, the selected movement mechanism is actuated.

Note that during rotational operation of the dial 58, in conjunction with rotational operation of the dial 58, the slider 78 supported so as to be capable of sliding in the radial direction with respect to the dial 58 slides toward the radial direction center of the dial 58. The knob engagement portion 80A provided to the slider 78 is thereby disposed between the pair of slider engagement portions 122A, 122B provided to the knob 110. Since the pair of slider engagement portions 122A, 122B face each other in the rotation direction of the knob 110, in a state in which the knob engagement portion 80A is disposed between the pair of slider engagement portions 122A, 122B, rotational operation of the knob 110 is able to be restricted by the pair of slider engagement portions 122A, 122B and the knob engagement portion 80A abutting against each other.

However, during rotational operation of the knob 110, one out of the pair of slider engagement portions 122A, 122B opposes the knob engagement portion 80A from toward the radial direction center of the dial 58. In this state, sliding of the slider 78 toward the radial direction center of the dial 58 is restricted by the knob engagement portion 80A of the slider 78 abutting the one out of the pair of slider engagement portions 122A, 122B. This enables rotational operation of the dial 58 accompanying (in conjunction with) sliding of the slider 78 to be restricted. The present exemplary embodiment thereby enables malfunction of one of the plural movement mechanisms due to simultaneous operation of the dial 58 and the knob 110 to be prevented.

Further, in the present exemplary embodiment, the knob 110 rotationally operated with respect to the dial 58 is provided so as to be coaxial with the dial 58. This enables the shape of the knob engagement portion 80A provided to the slider 78 that is slid with respect to the dial 58 and the shape of the pair of slider engagement portions 122A, 122B provided to the knob 110 to be set according to the rotational center of the dial 58. This enables design to be simplified.

Further, in the present exemplary embodiment, the dial base 32 that attaches to the power seat 12 supports the dial 58 such that the dial 58 is capable of rotational operation. The cam portion 52 engaged (abutted) by the slider 78 is provided to the dial base 32. When the dial 58 is rotationally operated with respect to the dial base 32, the slider 78 supported so as to be capable of sliding in the radial direction with respect to the dial 58 engages with the cam portion 52 so as to slide along the radial direction of the dial 58. This enables rotational operation of the dial 58 and sliding of the slider 78 to be coordinated using a simple configuration.

Further, in the present exemplary embodiment, the slider 78 supported so as to be capable of sliding in the radial direction with respect to the dial 58 is abutted against the cam portion 52 of the dial base 32 by biasing force from the roller spring 88. The cam portion 52 forms an undulation in the radial direction of the dial 58, and during rotational operation of the dial 58, the slider 78 moves along the undulation of the cam portion 52. The undulation in the cam portion 52 enables a clicking sensation to be imparted to rotational operation of the dial 58. This clicking sensation can be easily adjusted by changing the size of the peaks 56 of the cam portion 52 or the inclination angles of the inclined faces of the peaks 56.

Further, in the present exemplary embodiment, the undulating face 52A of the cam portion 52 formed to the dial base 32 faces the radial direction center of the dial 58, and the slider supported by the dial 58 is biased toward the radial direction outer side of the dial 58 so as to abut the cam portion 52. This enables the undulation of the cam portion 52 to be set larger than in a configuration in which an undulating face of a cam portion faces the radial direction outer side of a dial and a slider is biased toward the radial direction center of the dial. Design and production is thus simplified.

Further, in the present exemplary embodiment, the cam portion 52 is formed to the dial base 32, and the slider 78 is supported by the dial 58. In the cam portion 52, the plural valleys 54A, 54B, 54C and the plural peaks 56A, 56B are alternately arranged in a row along the rotation direction of the dial 58 so as to form an undulation in the radial direction of the dial 58. The slider 78 is capable of sliding in the radial direction with respect to the dial 58, and is abutted against the cam portion 52 by biasing force from the roller spring 88. Fitting the slider 78 into one of the 54A, 54B, or 54C in the cam portion 52 retains the dial 58 at one of the rotary positions. This enables unintentional rotation of the dial 58 by an unexpected load to be prevented.

Further, during rotational operation of the dial 58, the slider 78 crosses over the peaks 56 of the cam portion 52 while elastically deforming the roller spring 88 and sliding with respect to the dial 58. In cases in which an operator has removed their hand from the dial 58 midway through such rotational operation, the slider 78 is fitted into a nearby valley 54 by elastic recovery force from the roller spring 88. When this occurs, force exerted on the dial 58 from the slider 78 is able to cause the dial 58 to move to a nearby rotary position, enabling the dial 58 to be prevented from stopping at a midway position of rotational operation. Malfunction, such as unintended actuation of a movement mechanism due to operation of the knob 110 in a state in which the dial 58 has stopped midway, can thereby be prevented from occurring.

Moreover, in the present exemplary embodiment, as described above, in the cam portion 52 formed to the dial base 32, the plural valleys 54A, 54B, 54C and the plural peaks 56A, 56B form an undulation in the radial direction of the dial 58, and the slider 78 supported by the dial 58 is capable of sliding in the radial direction of the dial 58. This enables a dimension of the device along the axial direction of the dial 58 to be set smaller. As a result, installation space for the power seat operation device 10 can be easily ensured in narrow gaps between the power seat 12 and a vehicle body side section, for example.

Further, in the present exemplary embodiment, the cam portion 52 is formed to the dial base 32 attached to the power seat 12, and the slider 78 is supported by the dial 58 provided so as to be capable of rotational operation with respect to the dial base 32. The plural rotary positions to which the dial 58 is rotationally operated are defined by the cam portion 52, and so forming the cam portion 52 in the dial base 32 that attaches to the power seat 12 enables the plural rotary positions to be precisely defined with respect to the power seat 12.

Further, in the present exemplary embodiment, the slider 78 includes the body portion 80 supported so as to be capable of sliding with respect to the dial 58, and the slider 78 includes the roller 84 rotatably supported by the body portion 80 so as to abut the cam portion 52 and that is rotated during rotational operation of the dial 58. Accordingly, in cases in which an operator has removed their hand from the dial 58 midway through rotational operation of the dial 58, namely, in the middle of the slider 78 crossing over a peak 56 of the cam portion 52, the slider 78 can be moved smoothly into a nearby valley 54 by rotation of the roller 84. This further contributes to the advantageous effect of the dial 58 being prevented from stopping at a midway position of rotational operation.

Supplementary Explanation of the Exemplary Embodiment

Although in the above exemplary embodiment explanation was given regarding a case in which the seat slide mechanism 20, the recliner mechanism 22, and the lifter mechanism 24 configure the plural movement mechanisms, the present invention is not limited thereto. For example, a tilt mechanism that adjusts an inclination angle of the seat cushion with respect to a vehicle front-rear direction, a side-support adjustment mechanism that adjusts the height of a side-support section provided to the seat cushion or the seat back, an ottoman mechanism that causes an ottoman to pivot, with respect to the seat cushion, about a pivot axis running along the seat width direction, may be applied as movement mechanisms.

Further, although in the above exemplary embodiment configuration is such that the cam portion 52 forms an undulation in the radial direction of the dial 58 and the slider 78 is abutted against the cam portion 52 by biasing force from an elastic member, the present invention is not limited thereto, and configuration may be such that the cam portion is configured by a zig-zag shaped guide groove and a protrusion provided to the slider is configured so as to slidably fit in the guide groove.

Further, although in the above exemplary embodiment configuration is such that the knob 110 is provided so as to be coaxial with the dial 58, the present invention is not limited thereto, and configuration may be such that the rotation axis of a knob and the rotation axis of the dial 58 are offset from each other.

Figure 19:
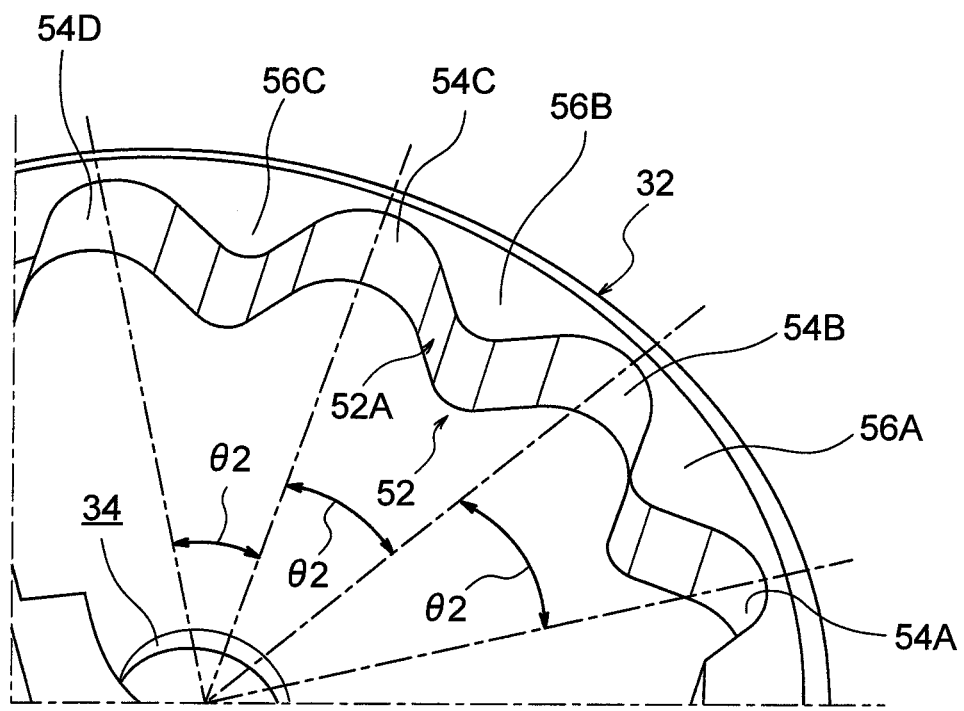
FIG. 19 is a perspective view corresponding to FIG. 10 illustrating another example (modified example) of a cam portion.

Further, although in the above exemplary embodiment, configuration is such that the cam portion 52 includes the three valleys 54A, 54B, 54C and the two peaks 56A, 56B, the number of the valleys and peaks may be modified as appropriate. For example, as illustrated in FIG. 19, configuration may be such that the cam portion 52 includes four valleys 54A, 54B, 54C, 54D and three peaks 56A, 56B, 56C. In the example illustrated in FIG. 19, 02 is set to 30°, and the valleys 54A, 54B, 54C, 54D are in a row along the circumferential direction of the dial base 32 at a pitch of 30° about the center of the dial base 32.

Further, although in the above exemplary embodiment configuration is such that the slider 78 includes the roller 84, the present invention is not limited thereto, and configuration may be such that the roller 84 is omitted.

Further, although in the above exemplary embodiment configuration is such that the cam portion 52 is formed to the dial base 32 and the slider 78 is supported by the dial 58, the present invention is not limited thereto. Configuration may be such that a cam portion is formed to a dial and a slider is supported by a dial base.

Further, although in the above exemplary embodiment configuration is such that the undulating face 52A of the cam portion 52 faces the radial direction center of the dial 58 and the slider 78 is biased toward the radial direction outer side of the dial 58, the present invention is not limited thereto. Configuration may be such that an undulating face of a cam portion faces a radial direction outer side of a dial and a slider is biased toward a radial direction center of the dial.

Various other modifications may be implemented within a range not departing from the spirit of the present invention. Obviously, the scope of rights encompassed by the present invention is not limited to the exemplary embodiment described above.

The entire disclosure of Japanese Patent Application No. 2015-084189 filed on Apr. 16, 2015 is incorporated by reference in the present specification. All cited documents, patent applications, and technical standards mentioned in the present specification are incorporated by reference in the present specification to the same extent as if each individual cited document, patent application, or technical standard was specifically and individually indicated to be incorporated by reference.

What is claimed is:

1. A power seat operation device, comprising:
    a dial that is rotatable with respect to a power seat provided with a plurality of movement mechanisms, with one of the plurality of movement mechanisms being selected by rotation of the dial;
    a knob that is rotatable with respect to the dial, the selected movement mechanism being actuated by rotation of the knob, and the knob including a pair of slider engagement portions that face each other in a rotation direction of the knob; and
    a slider that is supported so as to be slidable in a radial direction with respect to the dial, that includes a knob engagement portion, and that slides toward one side in the radial direction in conjunction with rotation of the dial such that the knob engagement portion is disposed between the pair of slider engagement portions when the dial is between positions for selecting the movement mechanisms, with one of the pair of slider engagement portions opposing the knob engagement portion from the one side in the radial direction during rotation of the knob when the dial is in one of the positions for selecting the movement mechanisms.

2. The power seat operation device of claim 1, wherein the knob is provided so as to be coaxial with the dial.

3. The power seat operation device of claim 1, further comprising:
    a dial base that is attached to the power seat, that is formed with a cam portion, and that supports the dial such that the dial is rotatable,
    wherein the slider slides with respect to the dial by engagement with the cam portion.

4. The power seat operation device of claim 3, wherein:
    the cam portion forms an undulation in the radial direction; and
    the slider is abutted against the cam portion by biasing force from an elastic member.

5. The power seat operation device of claim 4, wherein:
    the cam portion includes an undulating face that faces toward a center in the radial direction; and
    the slider is biased toward an outer side in the radial direction.

6. A power seat comprising:
    a seat body provided with the plurality of movement mechanisms; and
    the power seat operation device according to claim 1, the dial of the power seat operation device being provided so as to be rotatable with respect to the seat body.

\* \* \* \* \*